(12) United States Patent
Kim et al.

(10) Patent No.: US 11,639,136 B2
(45) Date of Patent: May 2, 2023

(54) STORAGE SYSTEM FOR VEHICLE DOOR

(71) Applicants: Hyundai Motor Company, Seoul (KR); Kia Corporation, Seoul (KR); SEOYON E-HWA CO., LTD., Anyang-si (KR)

(72) Inventors: Seong Chan Kim, Jeonju-Si (KR); Je Sun Han, Hwaseong-Si (KR); Hee Keun Kim, Uiwang-Si (KR)

(73) Assignees: Hyundai Motor Company, Seoul (KR); Kia Corporation, Seoul (KR); SEOYON E-HWA CO., LTD., Anyang-si (KR)

( * ) Notice: Subject to any disclaimer, the term of this patent is extended or adjusted under 35 U.S.C. 154(b) by 0 days.

(21) Appl. No.: 17/505,438

(22) Filed: Oct. 19, 2021

(65) Prior Publication Data

US 2022/0402438 A1    Dec. 22, 2022

(30) Foreign Application Priority Data

Jun. 22, 2021  (KR) .......................... 10-2021-0081147

(51) Int. Cl.
*B60R 7/08*   (2006.01)
(52) U.S. Cl.
CPC ................................. *B60R 7/081* (2013.01)

(58) Field of Classification Search
CPC ......... B60R 7/081; B60R 7/046; B60J 5/0413
USPC .............................................. 296/37.13, 37.5
See application file for complete search history.

(56) References Cited

U.S. PATENT DOCUMENTS

| 8,210,590 B1* | 7/2012 | Moberg | B60J 5/042 |
| | | | 224/544 |
| 9,238,440 B1* | 1/2016 | Bowser | B60R 7/046 |
| 2018/0186296 A1* | 7/2018 | Koo | B60R 11/00 |

FOREIGN PATENT DOCUMENTS

| CN | 112208445 A | * | 1/2021 | ............. B60R 7/046 |
| JP | 2000289530 A | * | 10/2000 | |
| KR | 970038441 A | * | 7/1997 | |
| KR | 200411701 Y1 | * | 3/2006 | |
| KR | 100828785 B1 | * | 5/2008 | |

* cited by examiner

*Primary Examiner* — Dennis H Pedder
*Assistant Examiner* — Kevin P Weldon
(74) *Attorney, Agent, or Firm* — Morgan, Lewis & Bockius LLP

(57) ABSTRACT

A storage system for a vehicle door may include: a vehicle door; a map pocket assembly movable with respect to the vehicle door; and a guide mechanism guiding a movement of the map pocket assembly, wherein a storage compartment is defined between the map pocket assembly and the vehicle door.

18 Claims, 19 Drawing Sheets

STORAGE SYSTEM FOR VEHICLE DOOR

CROSS-REFERENCE TO RELATED APPLICATION

The present application claims priority to Korean Patent Application No. 10-2021-0081147, filed on Jun. 22, 2021, the entire contents of which is incorporated herein for all purposes by this reference.

BACKGROUND OF THE INVENTION

Field of the Invention

The present invention relates to a storage system for a vehicle door, and more particularly, to a storage system for a vehicle door capable of varying the volume of a storage compartment as a map pocket assembly moves relative to the vehicle door.

Description of Related Art

In general, various internal components that provide aesthetic design (external styling) and functionality may be mounted on vehicles. For example, as a map pocket is mounted on a vehicle door, a storage compartment may be defined between the map pocket and the vehicle door, and the storage compartment may receive small and light items such as maps and books.

In the future mobility market where vehicle sharing services such as car-sharing, car-hailing, and ride-sharing are expanded, it is necessary to provide storage compartments having various structures and sizes according to individual users' personal preference for the vehicle interior components.

The vehicle door may include a door panel, a door module mounted on the door panel, and a door trim covering the entirety of the door module.

According to the related art, since the map pocket is one-piece construction with the door trim, and the volume of the storage compartment defined between the map pocket and the vehicle door is fixed, it may difficult to provide various storage compartments according to the users' tastes. An unnecessary empty space may be formed between the door module and the door trim mounted on the vehicle door, which may cause a space waste problem in the vehicle door.

A shared vehicle may be vulnerable to scratches on the internal components of the vehicle according to the user's carelessness. However, since the map pocket and the trim are integrally joined, it may not be easy to replace the map pocket.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a storage system for a vehicle door configured for varying the volume of a storage compartment defined between a map pocket assembly and a vehicle door as the map pocket assembly moves relative to the vehicle door.

According to various aspects of the present invention, a storage system for a vehicle door may include: a vehicle door; a map pocket assembly movable with respect to the vehicle door; and a guide mechanism guiding a movement of the map pocket assembly. A storage compartment may be defined between the map pocket assembly and the vehicle door.

The map pocket assembly may be movable with respect to a door module of the vehicle door, the map pocket assembly may move between a retracted position and an extended position, the retracted position may be a position in which the map pocket assembly is relatively close to the vehicle door, and the extended position may be a position in which the map pocket assembly is relatively far from the vehicle door.

The guide mechanism may include: a guide rail provided on the vehicle door; and a guide member provided on the map pocket assembly and slidable along the guide rail.

The guide rail may protrude from the vehicle door toward the map pocket assembly, the map pocket assembly may include a mounting projection protruding toward the vehicle door, the guide member may be mounted on the mounting projection, and a longitudinal axis of the mounting projection may be parallel to a longitudinal axis of the guide rail.

The guide member may include a guide head and a shank extending from the guide head, the shank may be mounted on the mounting projection by a fastener, and the guide head may be movably received in the guide rail.

The guide rail may include a locking lug, the locking lug may be defined by a 'U'-shaped slot, and the locking lug may be cantilevered from the guide rail.

The guide head may have a locking recess, and the locking lug may have a locking projection. When the map pocket assembly is in the extended position, the locking recess of the guide head may be caught by the locking projection of the locking lug so that the guide member may be locked to the locking lug.

The map pocket assembly may include: a first pocket member having a shape of a pocket; and a second pocket member mounted on predetermined edge portions of the first pocket member.

The storage system may further include a covering mechanism covering a space between the map pocket assembly and the vehicle door when the map pocket assembly moves. The covering mechanism may include a first cover member movably connected to the second pocket member, and a second cover member movably connected to the first cover member.

The first cover member may be movably connected to the second pocket member through a first guide pin and a first spring, the first cover member may include a first mounting boss having a through hole through which the first guide pin extends, the second pocket member may include a second mounting boss having a recess to which the first guide pin is fixed, and the first spring may be located between the first mounting boss and the second mounting boss.

The first guide pin may include a head, a rod extending from the head, and a fixed end portion extending from an end portion of the rod, the head may have an external diameter greater than an internal diameter of the through hole of the first mounting boss, and the fixed end portion may be fixed to the recess of the second mounting boss.

The first cover member may move between a first maximum overlap position and a first minimum overlap position as the map pocket assembly moves, the first maximum overlap position may be a position in which the first cover member maximally overlaps a covering wall of the second pocket member, and the first minimum overlap position may be a position in which the first cover member minimally overlaps the covering wall of the second pocket member.

The second cover member may be movably connected to the first cover member through a second guide pin and a second spring, the second cover member may include a third mounting boss having a through hole through which the second guide pin extends, the second pocket member may have a through hole aligned with the through hole of the third mounting boss, the second guide pin may include a head and a rod extending from the head, the head may have an external diameter greater than an internal diameter of the through hole of the third mounting boss, the head may face the third mounting boss, and the second spring may be located between the head of the second guide pin and the third mounting boss.

The second cover member may move between a second maximum overlap position and a second minimum overlap position as the map pocket assembly moves, the second maximum overlap position may be a position in which the second cover member maximally overlaps the first cover member, and the second minimum overlap position may be a position in which the second cover member minimally overlaps the first cover member.

The second pocket member may include a covering wall with which the guide mechanism is covered.

The first cover member may be slidably mounted to the covering wall of the second pocket member, and the second cover member may be slidably mounted to the first cover member.

The first cover member may have a guide bar extending along a movement direction of the map pocket assembly, and the second cover member may have a guide rail in which the guide bar is received.

The guide bar may have a first stopper, and the guide rail may have a second stopper. When the map pocket assembly is in the extended position, the first stopper of the guide bar may come into contact with the second stopper of the guide rail.

The storage system may further include a rack and pinion mechanism assisting the movement of the map pocket assembly. The rack and pinion mechanism may include a rack provided on the vehicle door, and a pinion rotatably mounted on the map pocket assembly, and the pinion may mesh with the rack.

The storage system may further include: a magnet mounted on the vehicle door; and a magnetic metal mounted on the map pocket assembly.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
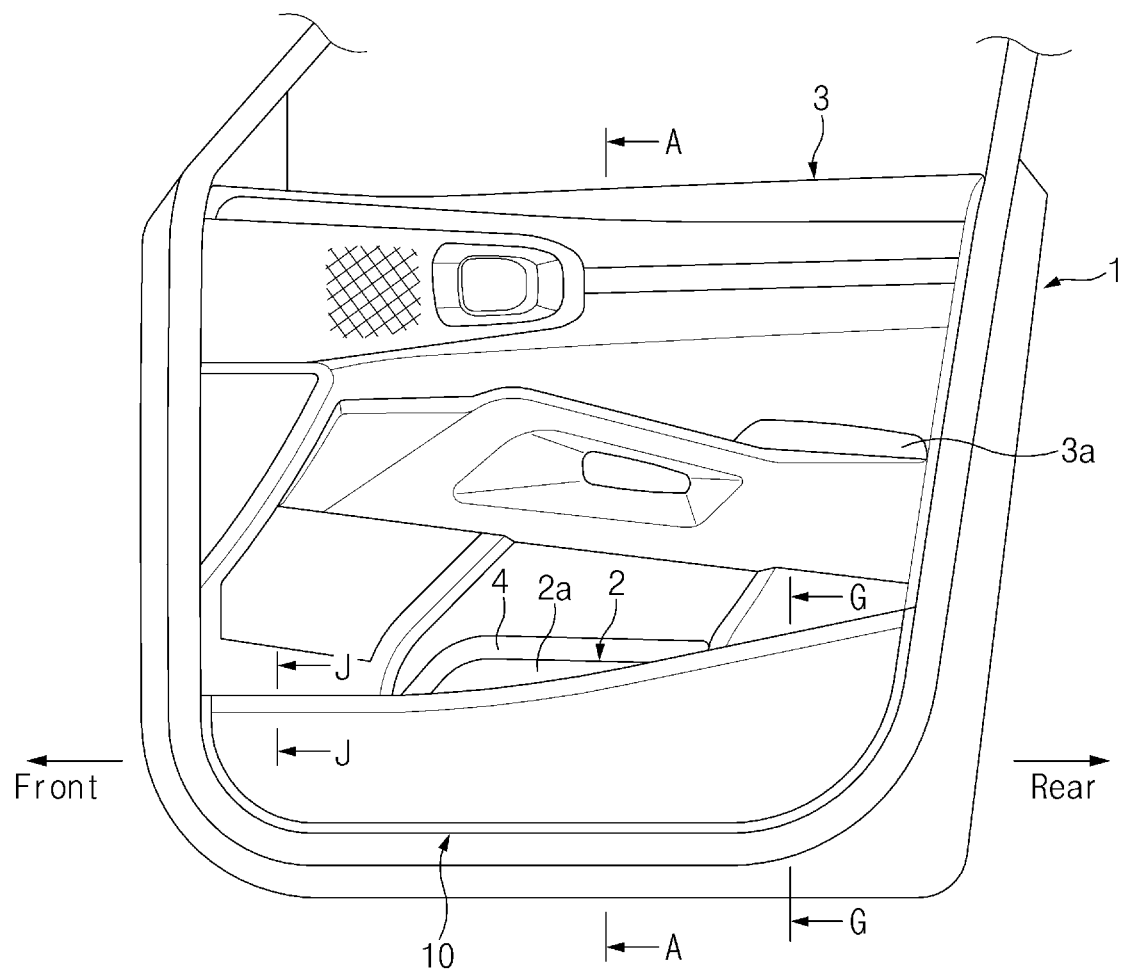
FIG. 1 illustrates a vehicle door having a map pocket according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the accompanying drawings. In the drawings, the same reference numerals will be used throughout to designate the same or equivalent elements. Furthermore, a detailed description of well-known techniques associated with the present invention will be ruled out in order not to unnecessarily obscure the gist of the present invention.

Terms such as first, second, A, B, (a), and (b) may be used to describe the elements in exemplary embodiments of the present invention. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which various exemplary embodiments of the present invention belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a storage system for a vehicle door according to various exemplary embodiments of the present invention may include a vehicle door 1, and a map pocket assembly 10 moving with respect to the vehicle door 1.

The vehicle door 1 may include a door panel, a door module 2 mounted on the door panel, and a door trim 3 covering the top portion of the door module 2.

The door panel may include an external panel facing the exterior of the vehicle, and an internal panel facing the interior of the vehicle.

The door module 2 may be disposed between the external panel and the internal panel. According to various exemplary embodiments of the present invention, the internal panel may have an opening facing the internal (a passenger compartment) of the vehicle, and the door module 2 may be mounted in the opening of the internal panel.

The door module 2 may include a plurality of hardware components such as a latch assembly, a speaker assembly, a window regulator, a handle assembly, electric/electronic components, and an electric harness assembly. The plurality of hardware components may be mounted on a door module housing or a door module panel 2a so that the plurality of hardware components may be modularized, and the door module panel 2a may be mounted in the opening of the internal panel.

Figure 3:
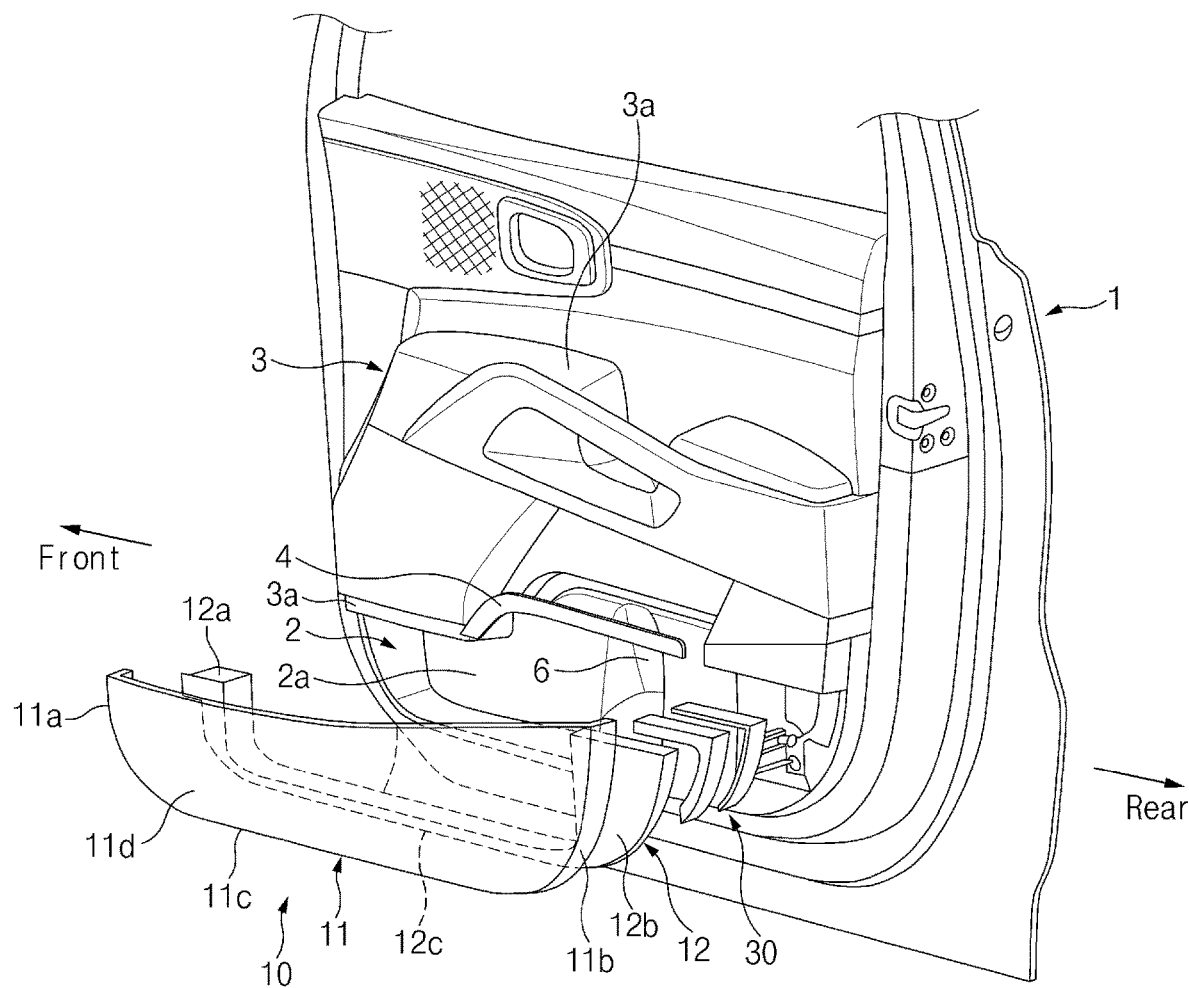
FIG. 3 illustrates an exploded perspective view of a vehicle door having a map pocket according to various exemplary embodiments of the present invention.

The door module panel 2a may support the plurality of hardware components, and the door module panel 2a may be made of a synthetic resin material such as plastic. According to various exemplary embodiments of the present invention, the door module panel 2a may be formed in one-piece. According to another exemplary embodiment of the present invention, the door module panel 2a may be formed from several pieces which are joined together. Referring to FIG. 3, a lower portion of the door module panel 2a may be exposed to the interior (the passenger compartment) of the vehicle through the opening of the internal panel.

The door trim 3 may cover the internal panel of the vehicle door 1 and an upper portion of the door module panel 2a, and the door trim 3 may face the internal (the passenger compartment) of the vehicle. An arm rest may be provided on the door trim 3.

Figure 2:
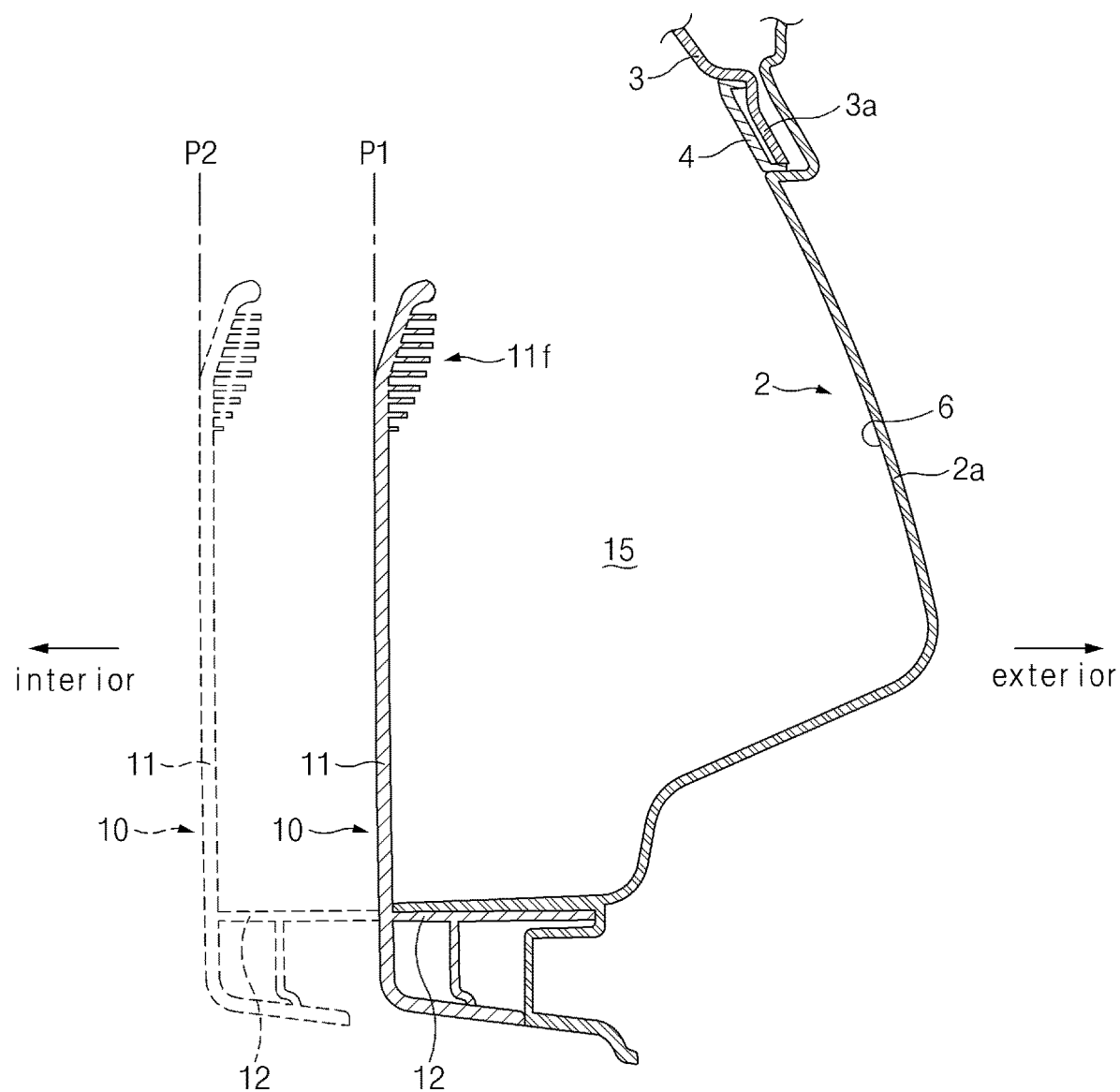
FIG. 2 illustrates a cross-sectional view, taken along line A-A of FIG. 1.

Referring to FIG. 2 and FIG. 3, the door module panel 2a may be joined to a bottom edge portion 3a of the door trim 3 through fasteners and/or the like. A joining portion between the door module panel 2a and the door trim 3 may be covered by an edge portion mold 4, which may prevent the joining portion between the door module panel 2a and the door trim 3 from being externally exposed so that the external styling thereof may be improved. Referring to FIG. 3, the edge portion mold 4 may extend along at least a portion of the bottom edge portion 3a of the door trim 3. The door module panel 2a may have a center recess 6 provided in the center portion thereof, and the center recess 6 may be recessed from the door module panel 2a toward the external panel of the door panel. The edge portion mold 4 may be located above the center recess 6.

Referring to FIG. 1, the map pocket assembly 10 may be disposed to cover a lower portion of the vehicle door 1, and the door trim 3 may be disposed to cover an upper portion of the vehicle door 1. The map pocket assembly 10 may be movable with respect to the lower portion of the door module panel 2a of the door module 2 below the door trim 3. For example, the door trim 3 may be an upper trim covering the upper portion of the door module panel 2a, and the map pocket assembly 10 may be a lower trim covering the lower portion of the door module panel 2a.

Referring to FIG. 2, the map pocket assembly 10 may be movably mounted with respect to the door module panel 2a of the door module 2. A storage compartment 15 for receiving items such as a map and a book may be defined between the door module panel 2a of the door module 2 and the map pocket assembly 10, and the top portion of the storage compartment 15 may be opened. According to various exemplary embodiments of the present invention, as the map pocket assembly 10 is movably mounted with respect to the door module panel 2a of the door module 2, a space between the door module panel 2a of the door module 2 and the map pocket assembly 10 may be fully utilized as the storage compartment 15. Thus, there is no need to waste an unnecessary empty space within the vehicle door 1, and space utilization may be improved.

Furthermore, as the center recess 6 of the door module panel 2a faces the map pocket assembly 10, the center recess 6 may form a portion of the storage compartment 15, and accordingly the volume of the storage compartment 15 may increase.

The map pocket assembly 10 may move with respect to the door module 2 of the vehicle door 1 in a width direction of the vehicle. Referring to FIG. 2, the map pocket assembly 10 may move between a retracted position P1 and an extended position P2. The retracted position P1 may be a position in which the map pocket assembly 10 is relatively close to the door module 2 of the vehicle door 1 as the map pocket assembly 10 moves toward the exterior of the vehicle, and the extended position P2 may be a position in which the map pocket assembly 10 is relatively far from the door module 2 of the vehicle door 1 as the map pocket assembly 10 moves toward the interior (the passenger compartment) of the vehicle. When the map pocket assembly 10 is in the extended position P2, the volume of the storage compartment 15 may be maximized, and when the map pocket assembly 10 is in the retracted position P1, the volume of the storage compartment 15 may be minimized.

Referring to FIG. 3, the map pocket assembly 10 may include a first pocket member 11 facing the passenger compartment of the vehicle and a second pocket member 12 facing the vehicle door 1.

The first pocket member 11 may have a pocket shape, and the first pocket member 11 may face the door module panel 2a of the vehicle door 1. The first pocket member 11 may include a front wall 11a facing the front of the vehicle, a rear wall 11b facing the rear of the vehicle, a bottom wall 11c facing the bottom portion of the vehicle, and a side wall 11d. The side wall 11d may connect the front wall 11a, the rear wall 11b, and the bottom wall 11c, and the side wall 11d may have an inboard side surface facing the interior (the passenger compartment) of the vehicle, and an outboard side surface facing the exterior (the door) of the vehicle. A pattern such as images and initials may be engraved on the inboard side surface of the first pocket member 11. Thus, the external styling of the first pocket member 11 exposed to the interior (the passenger compartment) of the vehicle may be improved.

Figure 10:
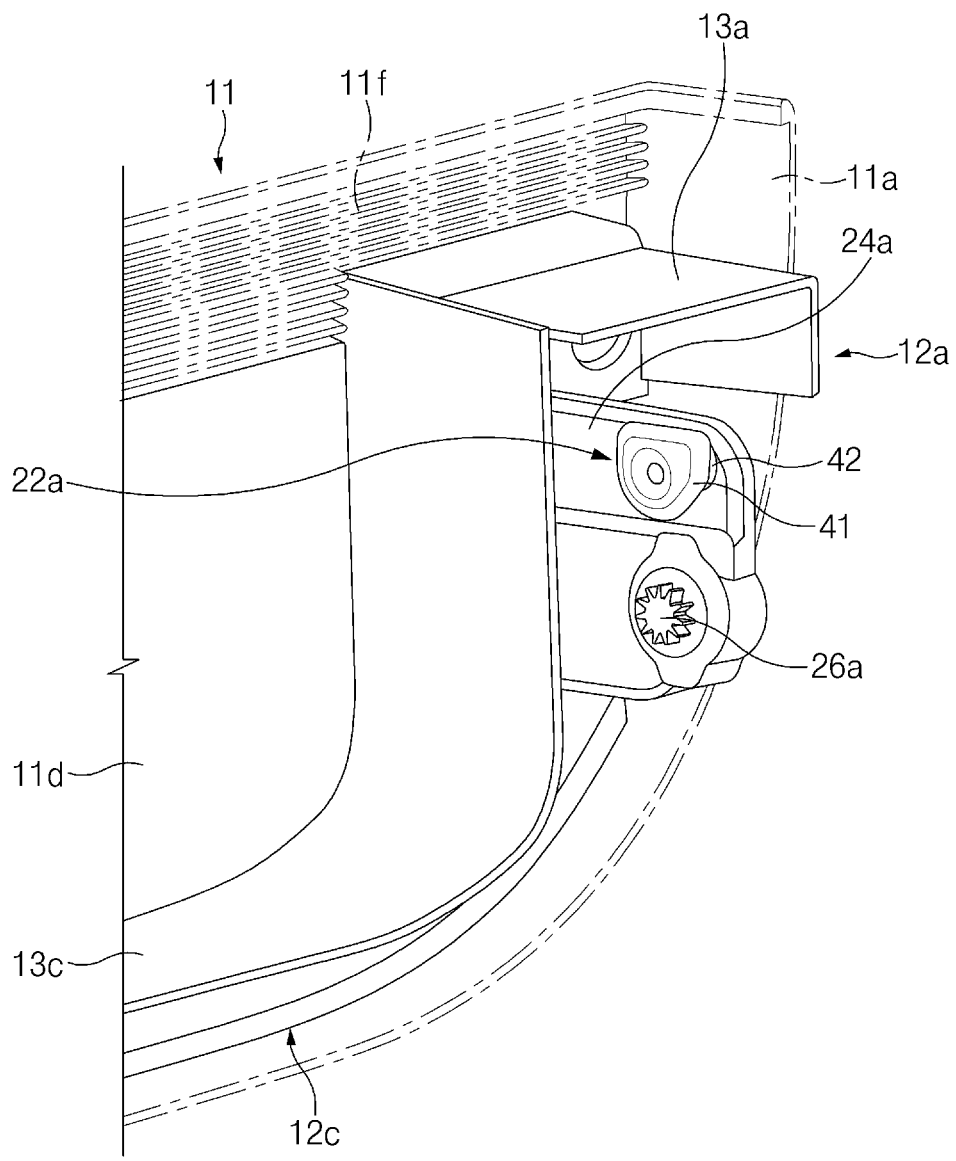
FIG. 10 illustrates an enlarged view of a portion indicated by arrow E of FIG. 8.

Referring to FIG. 2, the first pocket member 11 may have a grip portion 11f for a user's grip, and the grip portion 11f may be provided on a top end portion of the first pocket member 11. The grip portion 11f may be provided inside the top portion top end portion of the side wall 11d as illustrated in FIG. 10.

Figure 8:
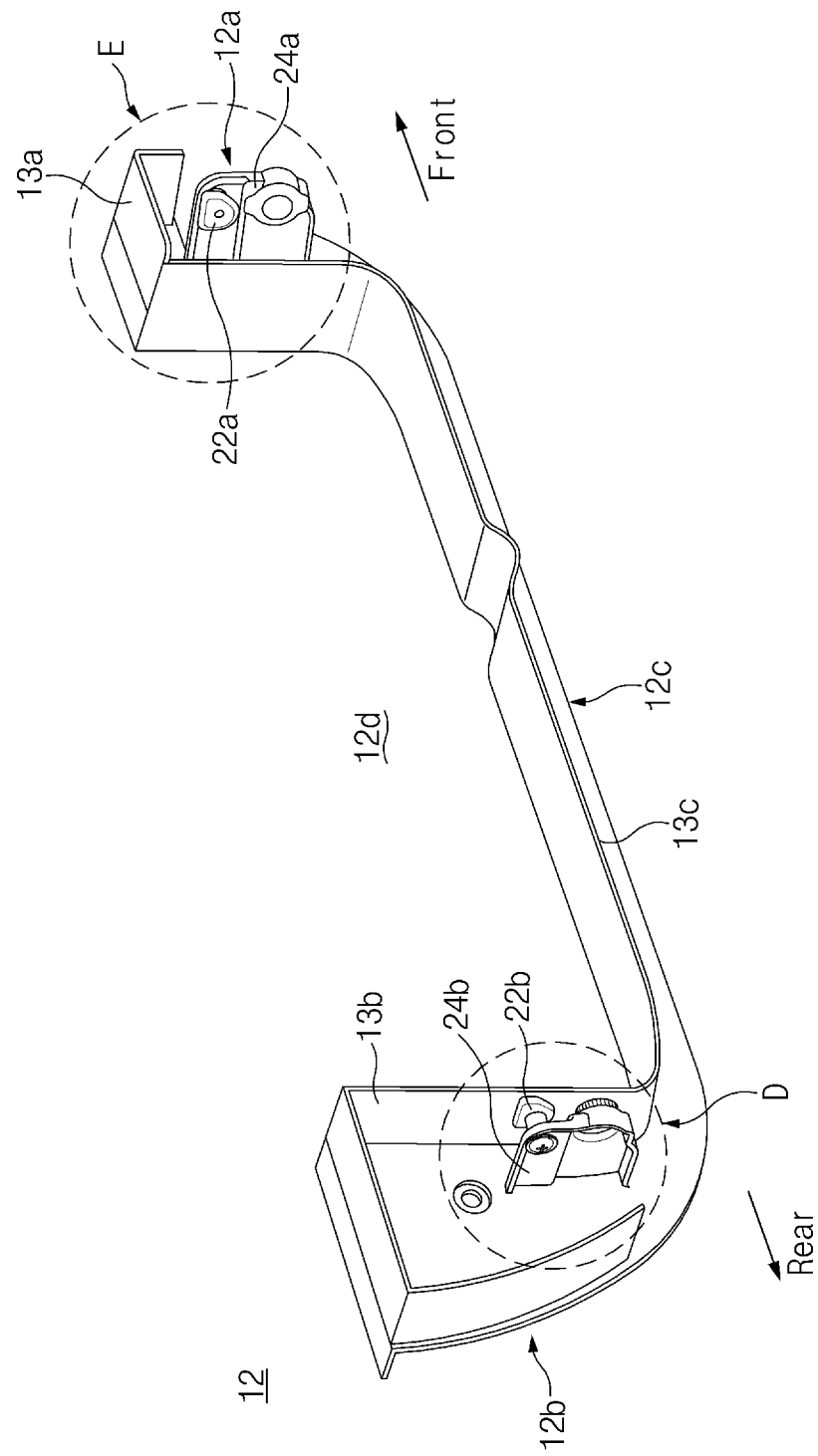
FIG. 8 illustrates a perspective view of a second pocket member of a vehicle door according to various exemplary embodiments of the present invention.

Referring to FIG. 3, the second pocket member 12 may have a shape corresponding to that defined by the front edge portion, rear edge portion, and bottom edge portion of the first pocket member 11, and the second pocket member 12 may be joined to the front edge portion, rear edge portion, and bottom edge portion of the first pocket member 11. The second pocket member 12 may include a front portion 12a facing the front of the vehicle, a rear portion 12b facing the rear of the vehicle, and a bottom portion 12c facing the bottom portion of the vehicle. Referring to FIG. 8, the second pocket member 12 may include a cavity 12d defined by the front portion 12a, the rear portion 12b, and the bottom portion 12c.

Figure 11:
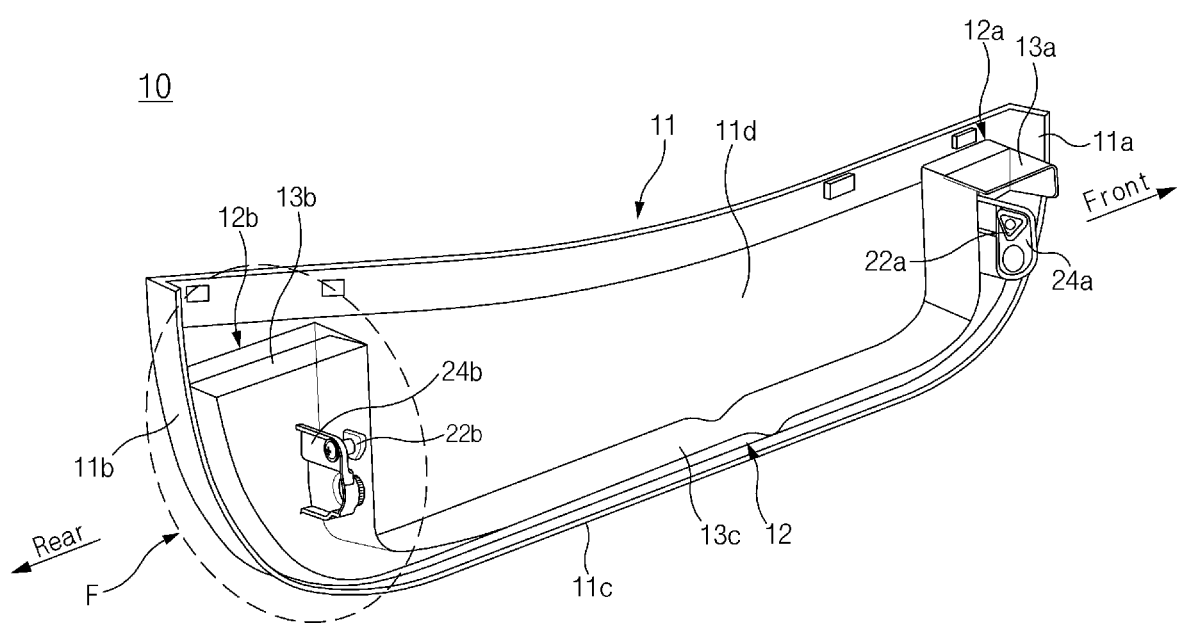
FIG. 11 illustrates a perspective view of a map pocket assembly of a vehicle door according to various exemplary embodiments of the present invention.
Figure 12:
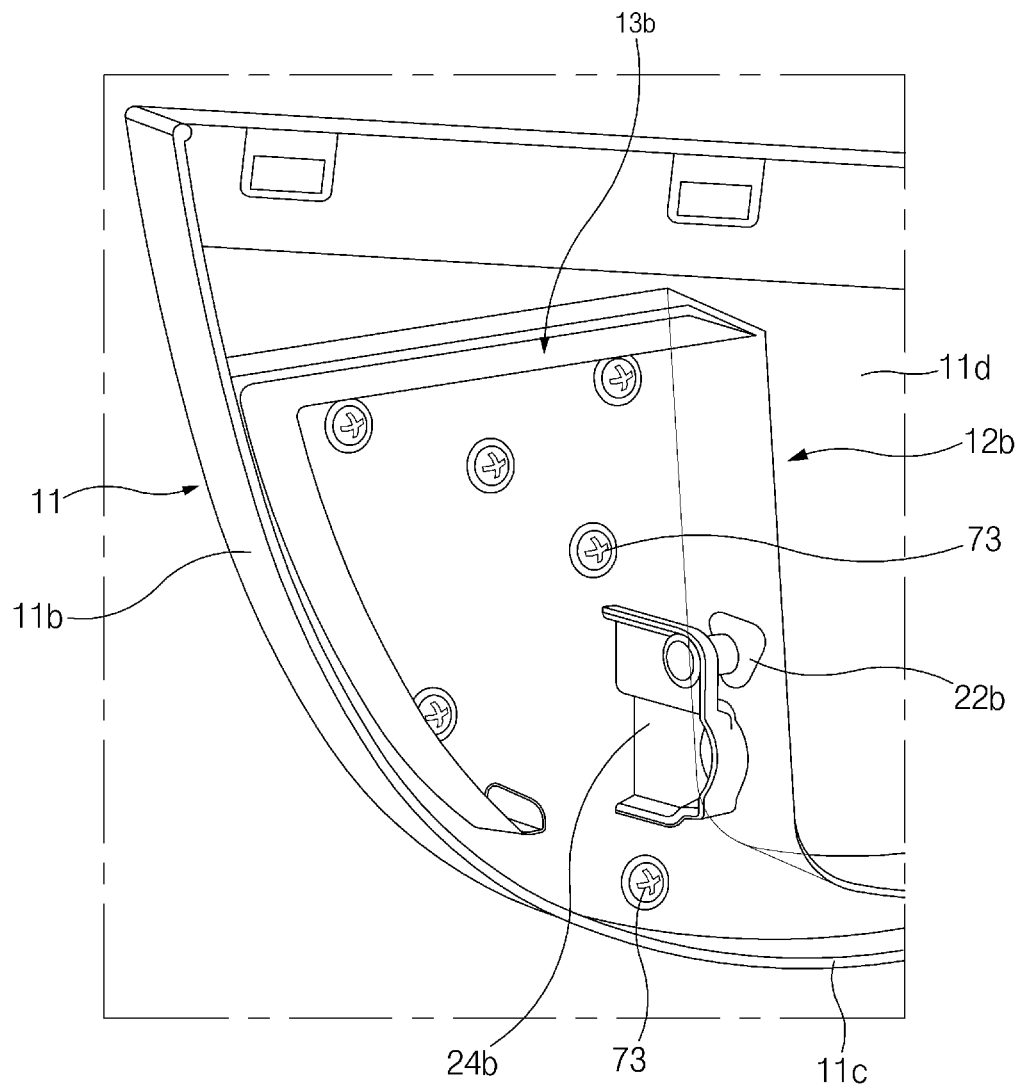
FIG. 12 illustrates an enlarged view of a portion indicated by arrow F of FIG. 11.
Figure 13:
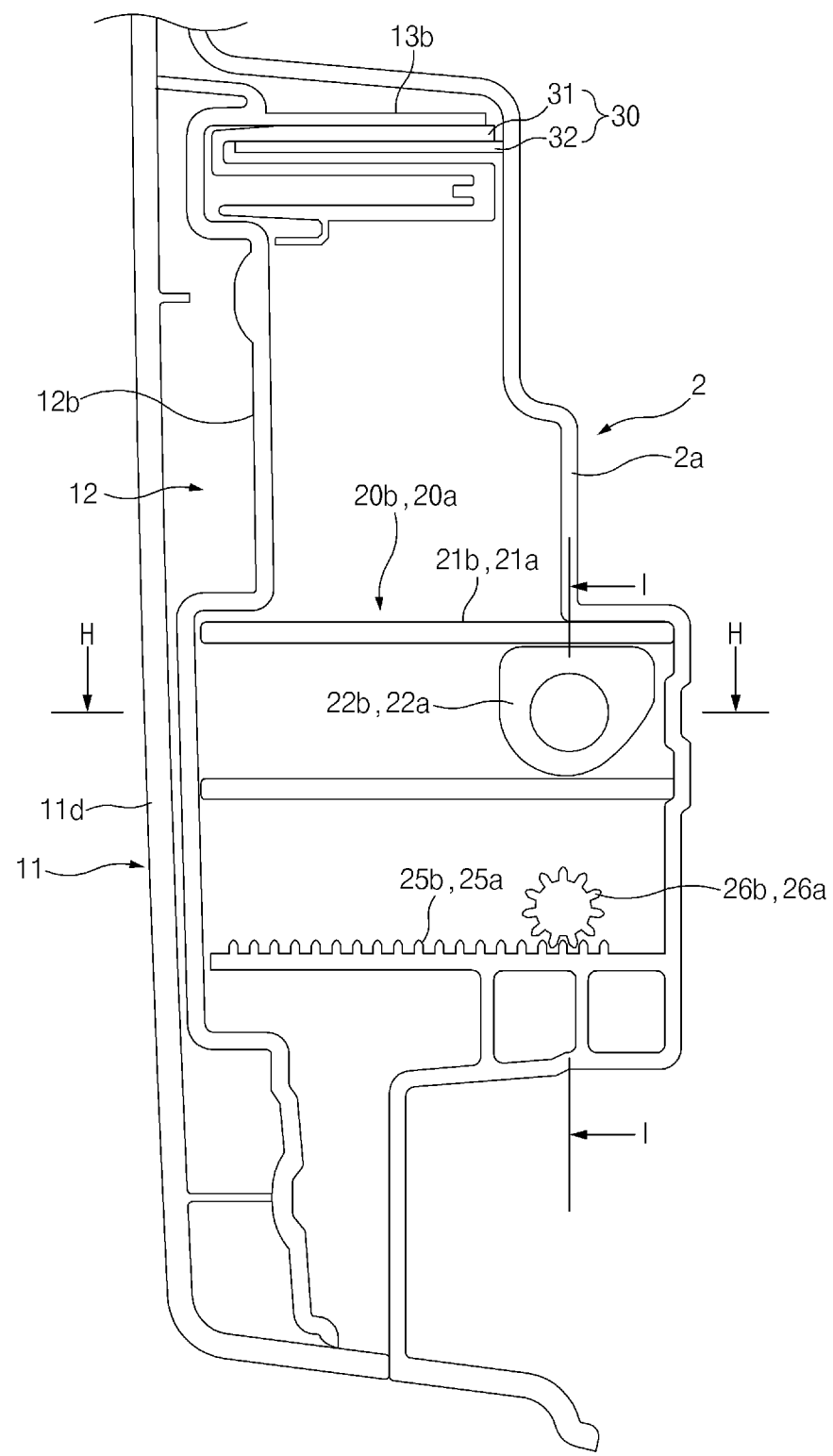
FIG. 13 illustrates a cross-sectional view, taken along line G-G of FIG. 1.

Referring to FIG. 11 and FIG. 12, the second pocket member 12 may be joined to the first pocket member 11 through fasteners 73 such as screws. The front portion 12a of the second pocket member 12 may be joined to the front wall 11a of the first pocket member 11, the rear portion 12b of the second pocket member 12 may be joined to the rear wall 11b of the first pocket member 11, and the bottom portion 12c of the second pocket member 12 may be joined to the bottom wall 11c of the first pocket member 11. The side wall 11d of the first pocket member 11 may face the cavity 12d of the second pocket member 12, and the cavity 12d may form a portion of the storage compartment 15.

The second pocket member 12 may be joined to the outboard side surface of the side wall 11d of the first pocket member 11 facing the door module panel 2a of the door module 2, and the storage compartment 15 may be defined by the door module panel 2a, the side wall 11d of the first pocket member 11, and the second pocket member 12.

The storage system for a vehicle door according to various exemplary embodiments of the present invention may include one or more guide mechanisms guiding the movement of the map pocket assembly 10.

Referring to FIGS. 4 to 13, two guide mechanisms 20a and 20b may be disposed between the door module panel 2a of the door module 2 and the second pocket member 12 of the map pocket assembly 10, and the two guide mechanisms 20a and 20b may be spaced from each other in a longitudinal direction of the door module 2 and a longitudinal direction of the map pocket assembly 10. The two guide mechanisms 20a and 20b may be symmetrically disposed with respect to the front and rear portions of the map pocket assembly 10. As the movement of the map pocket assembly 10 is guided by the two guide mechanisms 20a and 20b spaced from each other, the map pocket assembly 10 may move with respect to the door module 2 of the vehicle door 1 in a balanced and stable manner. The number of guide mechanisms is not limited thereto, and the storage system for a vehicle door may include one guide mechanism or three or more guide mechanisms.

Figure 4:
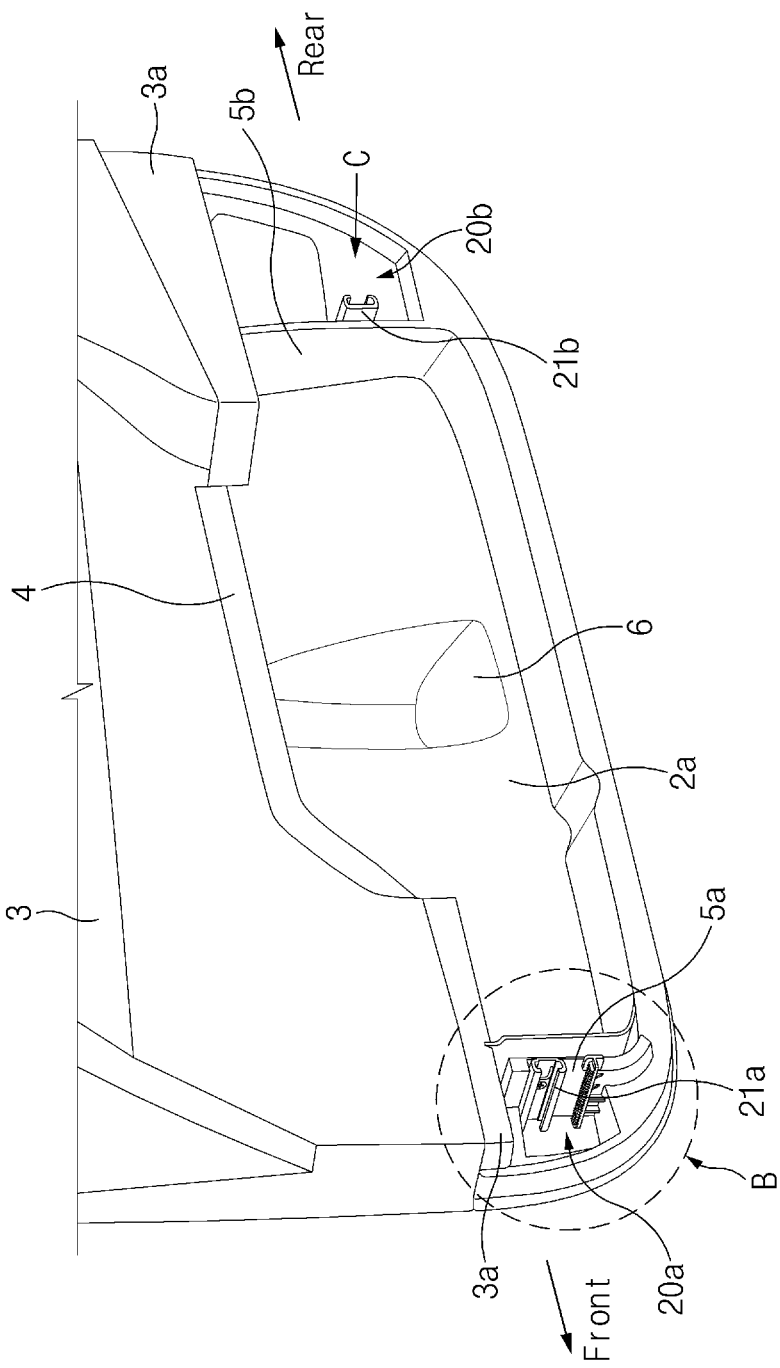
FIG. 4 illustrates a guide rail provided on a door module of a vehicle door according to various exemplary embodiments of the present invention.

Referring to FIG. 4, the door module panel 2a may have a front portion facing the front of the vehicle and a rear portion facing the rear of the vehicle. Two mounting walls 5a and 5b may be provided on the door module panel 2a. The two mounting walls 5a and 5b may include a front mounting wall 5a provided on the front portion of the door module panel 2a, and a rear mounting wall 5b provided on the rear portion of the door module panel 2a.

Referring to FIG. 11, the map pocket assembly 10 may have a front portion facing the front of the vehicle and a rear portion facing the rear of the vehicle, and two mounting projections 24a and 24b may be provided on the map pocket assembly 10. The two mounting projections 24a and 24b may include a front mounting projection 24a provided on the front portion of the map pocket assembly 10, and a rear mounting projection 24b provided on the rear portion of the map pocket assembly 10.

The two guide mechanisms 20a and 20b may include a front guide mechanism 20a disposed between the front portion of the door module panel 2a and the front portion of the map pocket assembly 10, and a rear guide mechanism 20b disposed between the rear portion of the door module panel 2a and the rear portion of the map pocket assembly 10.

The guide mechanisms 20a and 20b may include guide rails 21a and 21b provided on the door module panel 2a of the door module 2, and guide members 22a and 22b provided on the map pocket assembly 10.

The front guide mechanism 20a may include a front guide rail 21a provided on the front portion of the door module panel 2a, and a front guide member 22a provided on the front portion of the map pocket assembly 10.

Figure 5:
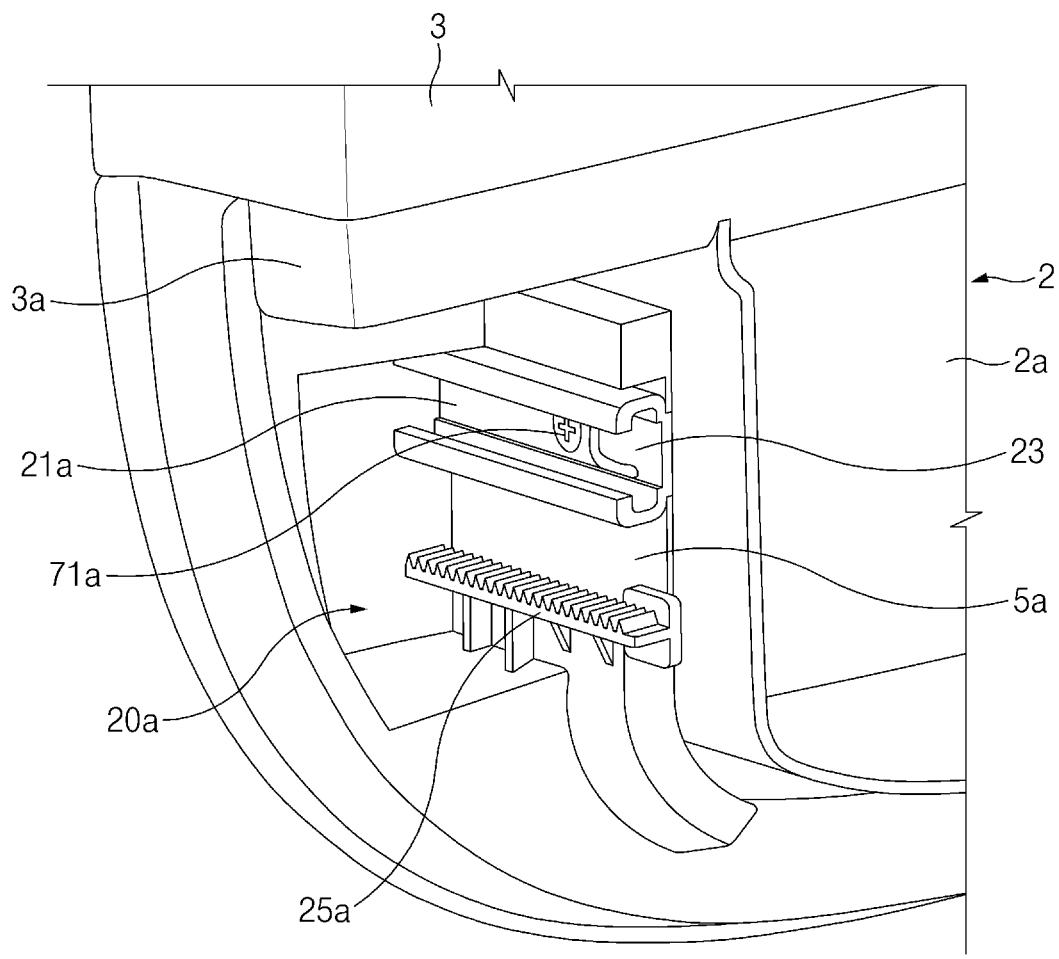
FIG. 5 illustrates an enlarged view of a portion indicated by arrow B of FIG. 4.

Referring to FIG. 4 and FIG. 5, the front guide rail 21a may be provided on the front portion of the door module panel 2a, and the front guide rail 21a may protrude from the front portion of the door module panel 2a toward the map pocket assembly 10. The front mounting wall 5a may protrude from the front portion of the door module panel 2a toward the map pocket assembly 10, and the front guide rail 21a may be detachably mounted on the front mounting wall 5a of the door module panel 2a through a fastener 71a such as a screw.

Referring to FIGS. 8 and 10, the front guide member 22a may be provided on the front portion of the map pocket assembly 10. The front mounting projection 24a may protrude from the front portion 12a of the second pocket member 12 toward the door module 2, and the front guide member 22a may be detachably mounted on the front mounting projection 24a of the second pocket member 12 through a fastener such as a screw. A longitudinal axis of the front mounting projection 24a may be parallel to a longitudinal axis of the front guide rail 21a.

The rear guide mechanism 20b may include a rear guide rail 21b provided on the rear portion of the door module panel 2a, and a rear guide member 22b provided on the rear portion of the map pocket assembly 10.

Figure 6:
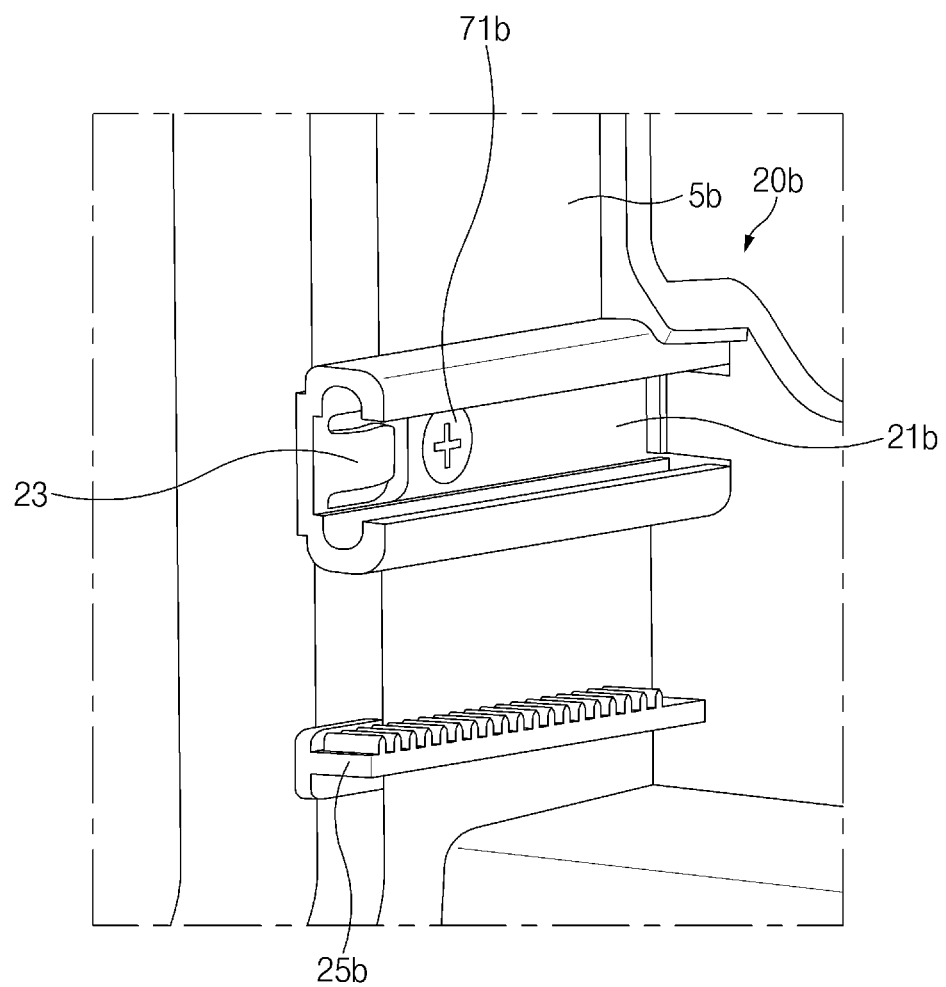
FIG. 6 illustrates the guide rail which is viewed from direction C of FIG. 4.

Referring to FIGS. 4 and 6, the rear guide rail 21b may be provided on the rear portion of the door module panel 2a, and the rear guide rail 21b may protrude from the rear portion of the door module panel 2a toward the map pocket assembly 10. The rear mounting wall 5b may protrude from the rear portion of the door module panel 2a toward the map pocket assembly 10, and the rear guide rail 21b may be detachably mounted on the rear mounting wall 5b of the door module panel 2a through a fastener 71b such as a screw.

Figure 9:
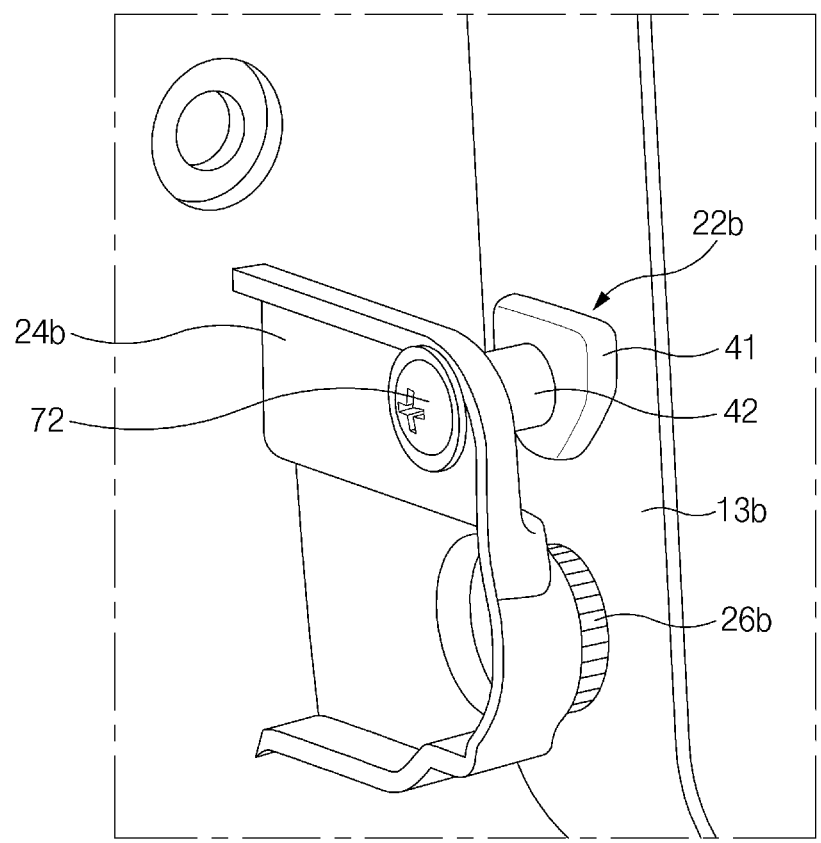
FIG. 9 illustrates an enlarged view of a portion indicated by arrow D of FIG. 8.

Referring to FIG. 8 and FIG. 9, the rear guide member 22b may be provided on the rear portion of the map pocket assembly 10. The rear mounting projection 24b may protrude from the rear portion 12b of the second pocket member 12 toward the door module 2, and the rear guide member 22b may be detachably mounted on the rear mounting projection 24b of the second pocket member 12 through a fastener such as a screw. A longitudinal axis of the rear mounting projection 24b may be parallel to a longitudinal axis of the rear guide rail 21b.

When the map pocket assembly 10 moves between the retracted position P1 and the extended position P2, the front guide member 22a may slide along the front guide rail 21a, and the rear guide member 22b may slide along the rear guide rail 21b so that the movement of the map pocket assembly 10 may be guided.

Figure 14:
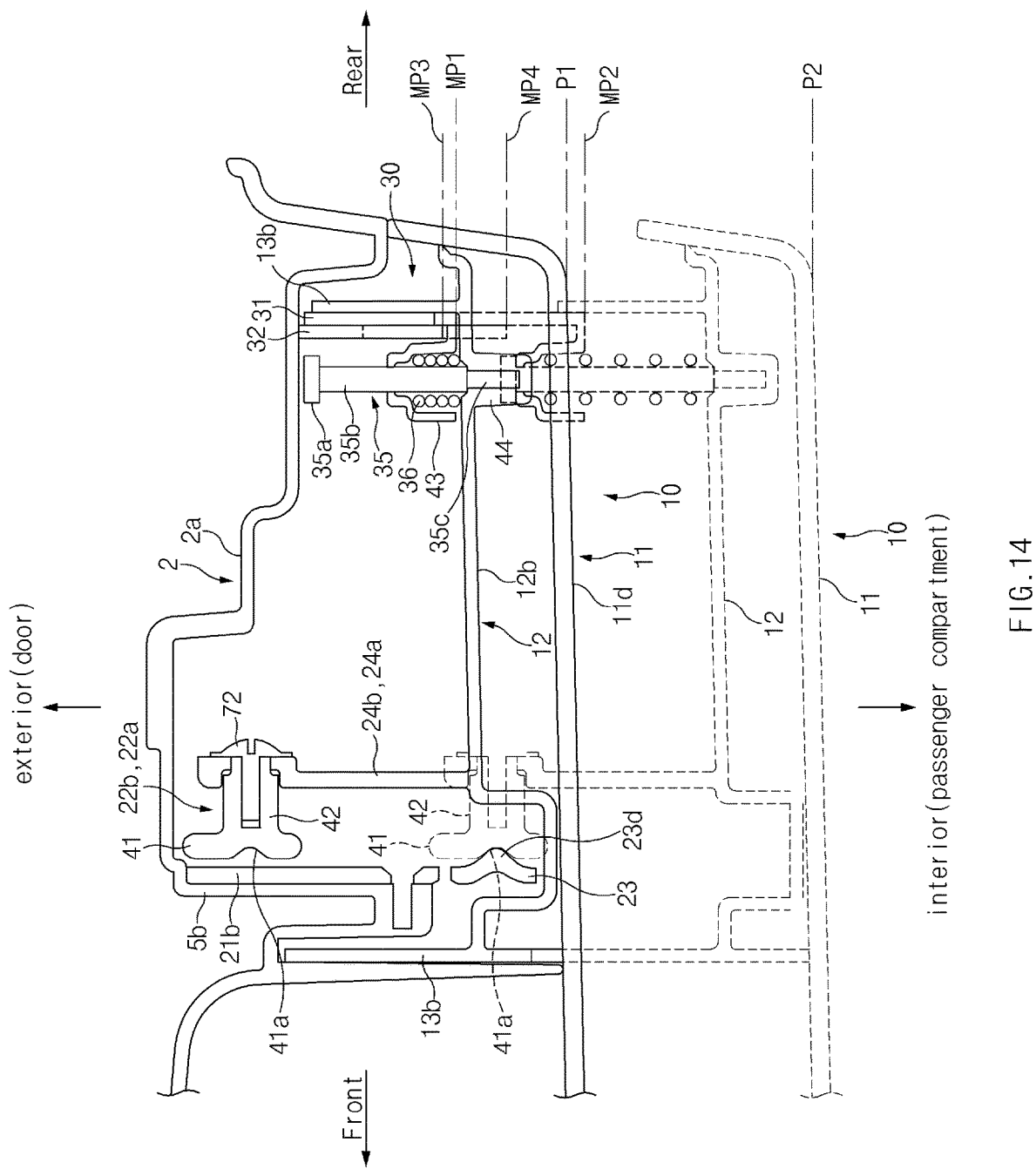
FIG. 14 illustrates a cross-sectional view, taken along line H-H of FIG. 13.
Figure 15:
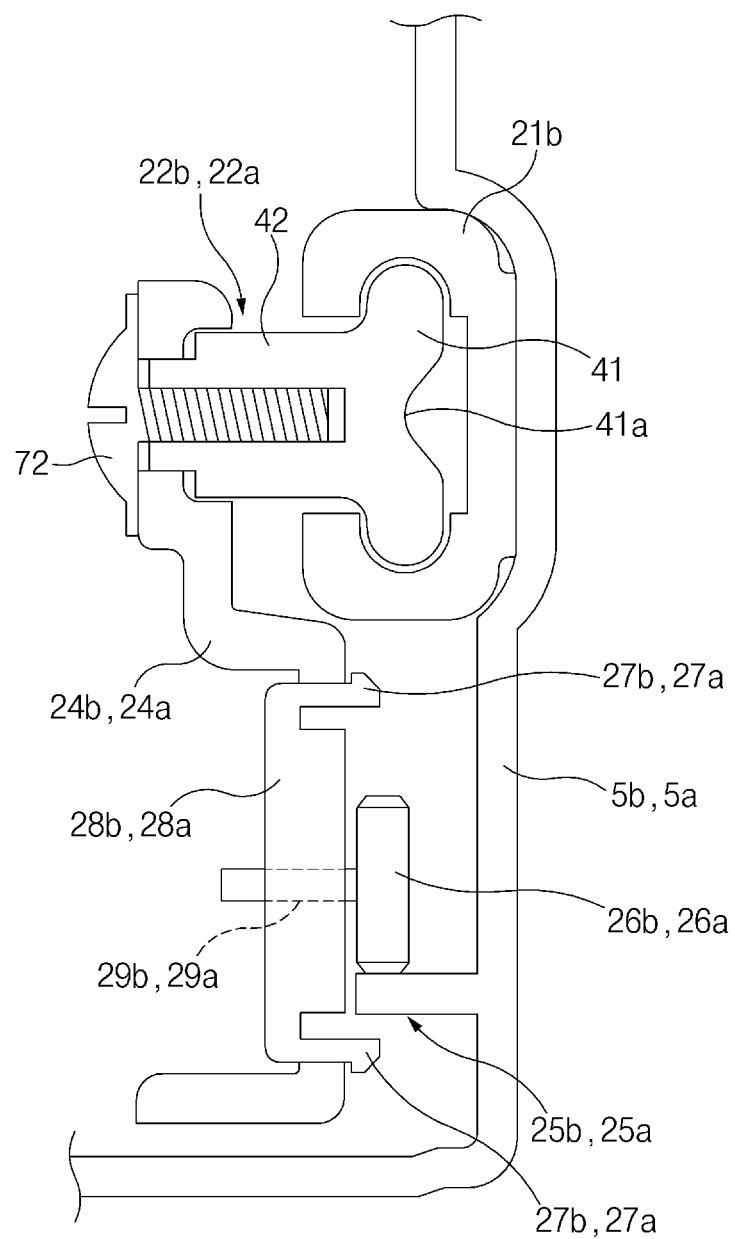
FIG. 15 illustrates a cross-sectional view, taken along line I-I of FIG. 13.

Referring to FIG. 14, and FIG. 15, each of the guide members 22a and 22b may include a guide head 41 and a shank 42 extending from the guide head 41. The guide heads 41 of the guide members 22a and 22b may be movably received in the guide rails 21a and 21b, respectively, and the shanks 42 of the guide members 22a and 22b may be detachably mounted on the mounting projections 24a and 24b through fasteners 72 such as screws, respectively. The guide head 41 may have a locking recess 41a, and the locking recess 41a may have a hemispherical shape.

Figure 7:
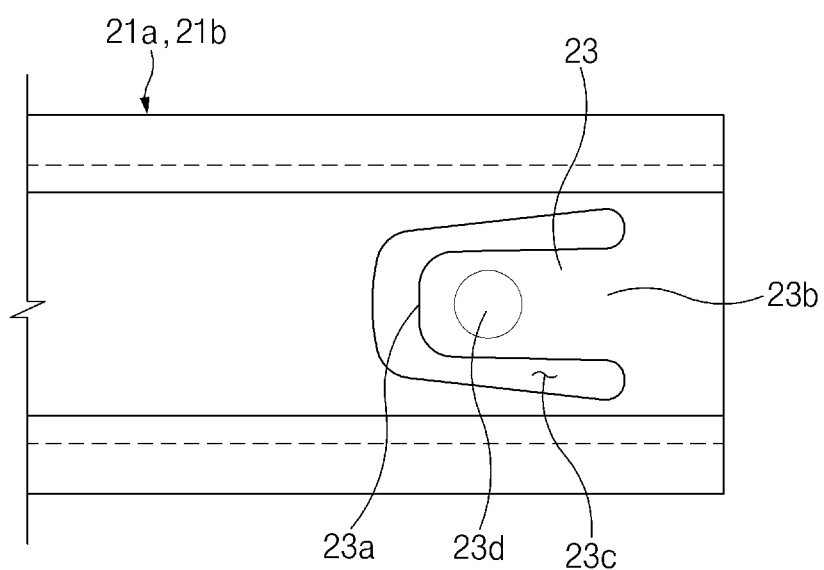
FIG. 7 illustrates a locking lug of the guide rail illustrated in FIG. 5.

Referring to FIG. 7, each of the guide rails 21a and 21b may include a locking lug 23, and the locking lug 23 may be provided on an end portion of each of the guide rails 21a and 21b. The locking lug 23 may be defined by a V-shaped slot 23c at the end portion of each of the guide rails 21a and 21b, and the locking lug 23 may include a free end portion 23a and a connection end portion 23b opposite each other. As the connection end portion 23b is connected to the guide rails 21a and 21b, the locking lug 23 may be cantilevered from the guide rails 21a and 21b. As a force is applied to the locking lug 23, the locking lug 23 may be elastically deflected or deformed from the guide rails 21a and 21b, and the free end portion 23a may be bent from the guide rails 21a and 21b. The locking lug 23 may have a locking projection 23d, and the locking projection 23d may have a hemispherical shape.

Referring to FIG. 14, when the map pocket assembly 10 is in the extended position P2, the locking recess 41a of the guide members 22a and 22b may be caught by the locking projection 23d of the locking lug 23 so that the guide members 22a and 22b may be locked to the locking lug 23.

When the map pocket assembly 10 moves from the extended position P2 toward the interior (the passenger compartment) of the vehicle, the locking lug 23 may be elastically deflected or deformed and the locking recess 41a of the guide members 22a and 22b may pass the locking projection 23d of the locking lug 23 and move toward the interior (the passenger compartment) of the vehicle. Thus, the guide members 22a and 22b of the map pocket assembly 10 may be completely released from the guide rails 21a and 21b of the door module panel 2a, and the map pocket assembly 10 may be completely separated from the door module panel 2a. That is, the map pocket assembly 10 may be completely separated from the door module panel 2a of the door module 2 by the elastic deformation of the locking lug 23, and thus the replacement of the map pocket assembly may be facilitated. Since the map pocket assembly 10 is easily separated, the old map pocket assembly may be easily replaced with a new map pocket assembly, or various map pocket assemblies may be selectively applied according to the users' tastes.

The storage system for a vehicle door according to various exemplary embodiments of the present invention may further include a rack and pinion mechanism assisting the movement of the map pocket assembly 10 when the map pocket assembly 10 moves through the guide mechanisms 20a and 20b.

Two rack and pinion mechanisms may include a front rack and pinion mechanism disposed between the front portion of the door module panel 2a and the front portion of the map pocket assembly 10, and a rear rack and pinion mechanism disposed between the rear portion of the door module panel 2a and the rear portion of the map pocket assembly 10.

The rack and pinion mechanisms may include racks 25a and 25b provided on the door module panel 2a, and pinions 26a and 26b provided on the map pocket assembly 10.

The front rack and pinion mechanism may include a front rack 25a provided on the front portion of the door module panel 2a, and a front pinion 26a provided on the front portion of the map pocket assembly 10.

Referring to FIG. 5, the front rack 25a may be provided on the front portion of the door module panel 2a. The front rack 25a may protrude from the front portion of the door module panel 2a toward the map pocket assembly 10, and the front rack 25a may have a plurality of rack teeth provided in a longitudinal direction thereof. The front rack 25a may be located below the front guide rail 21a, and the front rack 25a may be integrally formed on the front mounting wall 5a of the door module panel 2a. A longitudinal axis of the front rack 25a may be parallel to the longitudinal axis of the front guide rail 21a.

Referring to FIG. 10, the front pinion 26a may be provided on the front portion of the map pocket assembly 10. The front pinion 26a may have a plurality of pinion teeth provided on an external circumference thereof, and the pinion teeth of the front pinion 26a may mesh with the rack teeth of the front rack 25a. The front pinion 26a may be located below the front guide member 22a. The front pinion 26a may be rotatably mounted on the front mounting projection 24a of the second pocket member 12.

When the map pocket assembly 10 moves between the retracted position P1 and the extended position P2, the front pinion 26a may move in the longitudinal direction of the front rack 25a, assisting the movement of the map pocket assembly 10.

The rear rack and pinion mechanism may include a rear rack 25b provided on the rear portion of the door module panel 2a, and a rear pinion 26b provided on the rear portion of the map pocket assembly 10.

Referring to FIG. 6, the rear rack 25b may be provided on the rear portion of the door module panel 2a. The rear rack 25b may protrude from the rear portion of the door module panel 2a toward the map pocket assembly 10, and the rear rack 25b may have a plurality of rack teeth provided in a longitudinal direction thereof. The rear rack 25b may be located below the rear guide rail 21b, and the rear rack 25b may be integrally formed on the rear mounting wall 5b of the door module panel 2a. A longitudinal axis of the rear rack 25b may be parallel to the longitudinal axis of the rear guide rail 21b.

Referring to FIG. 9, the rear pinion 26b may be provided on the rear portion of the map pocket assembly 10. The rear pinion 26b may have a plurality of pinion teeth provided on an external circumference thereof, and the pinion teeth of the rear pinion 26b may mesh with the rack teeth of the rear rack 25b. The rear pinion 26b may be located below the rear guide member 22b. The rear pinion 26b may be rotatably mounted on the rear mounting projection 24b of the second pocket member 12.

When the map pocket assembly 10 moves between the retracted position P1 and the extended position P2, the rear pinion 26b may move in the longitudinal direction of the rear rack 25b, assisting the movement of the map pocket assembly 10.

Referring to FIG. 15, the rear pinion 26b may be rotatably mounted on the rear mounting projection 24b through a rear mounting member 28b. The rear mounting member 28b may have a plurality of hooks 27b, and the rear mounting member 28b may be snap-fitted into a through hole of the rear mounting projection 24b through the plurality of hooks 27b. The rear pinion 26b may be rotatable with respect to the rear mounting member 28b through a shaft 29b. The front pinion 26a may be rotatably mounted on the front mounting projection 24a through a front mounting member 28a. The front mounting member 28a may have a plurality of hooks 27a, and the front mounting member 28a may be snap-fitted into a through hole of the front mounting projection 24a through the plurality of hooks 27a. The front pinion 26a may be rotatable with respect to the front mounting member 28a through a shaft 29a.

As described above, each rack and pinion mechanism may assist the movement of the map pocket assembly 10 through the meshing of the rack and the pinion, improving the user's control of the map pocket assembly 10, reducing the moving speed of the map pocket assembly 10, and maintaining the map pocket assembly 10 in a predetermined position.

Referring to FIG. 8, the second pocket member 12 may include two covering walls 13a and 13b with which the guide mechanisms 20a and 20b are covered, respectively. The covering walls 13a and 13b may partially surround the mounting projections 24a and 24b and the guide members 22a and 22b of the guide mechanisms 20a and 20b, respectively, and the covering walls 13a and 13b may protrude from the second pocket member 12 toward the door module panel 2a.

Referring to FIG. 8, a front covering wall 13a may extend along at least some edge portions of the front portion 12a of the second pocket member 12, and the front covering wall 13a may extend along top and front edge portions of the front portion 12a of the second pocket member 12. A rear covering wall 13b may extend along at least some edge portions of the rear portion 12b of the second pocket member 12, and the rear covering wall 13b may extend along top and rear edge portions of the rear portion 12b of the second pocket member 12. The second pocket member 12 may have a connection wall 13c connecting the front covering wall 13a and the rear covering wall 13b, and the connection wall 13c may extend along the bottom portion 12c of the second pocket member 12.

The storage system for a vehicle door according to various exemplary embodiments of the present invention may include a covering mechanism 30 covering a space between the map pocket assembly 10 and the door module 2 of the vehicle door 1 when the map pocket assembly 10 moves. The covering mechanism 30 may prevent at least one of the two guide mechanisms 20a and 20b from being externally exposed when the map pocket assembly 10 moves.

Referring to FIGS. 14 and 17 to 19, the covering mechanism 30 may include a first cover member 31 and a second cover member 32. The first cover member 31 may be movably mounted to the second pocket member 12, and the second cover member 32 may be movably mounted to the first cover member 31.

Figure 17:
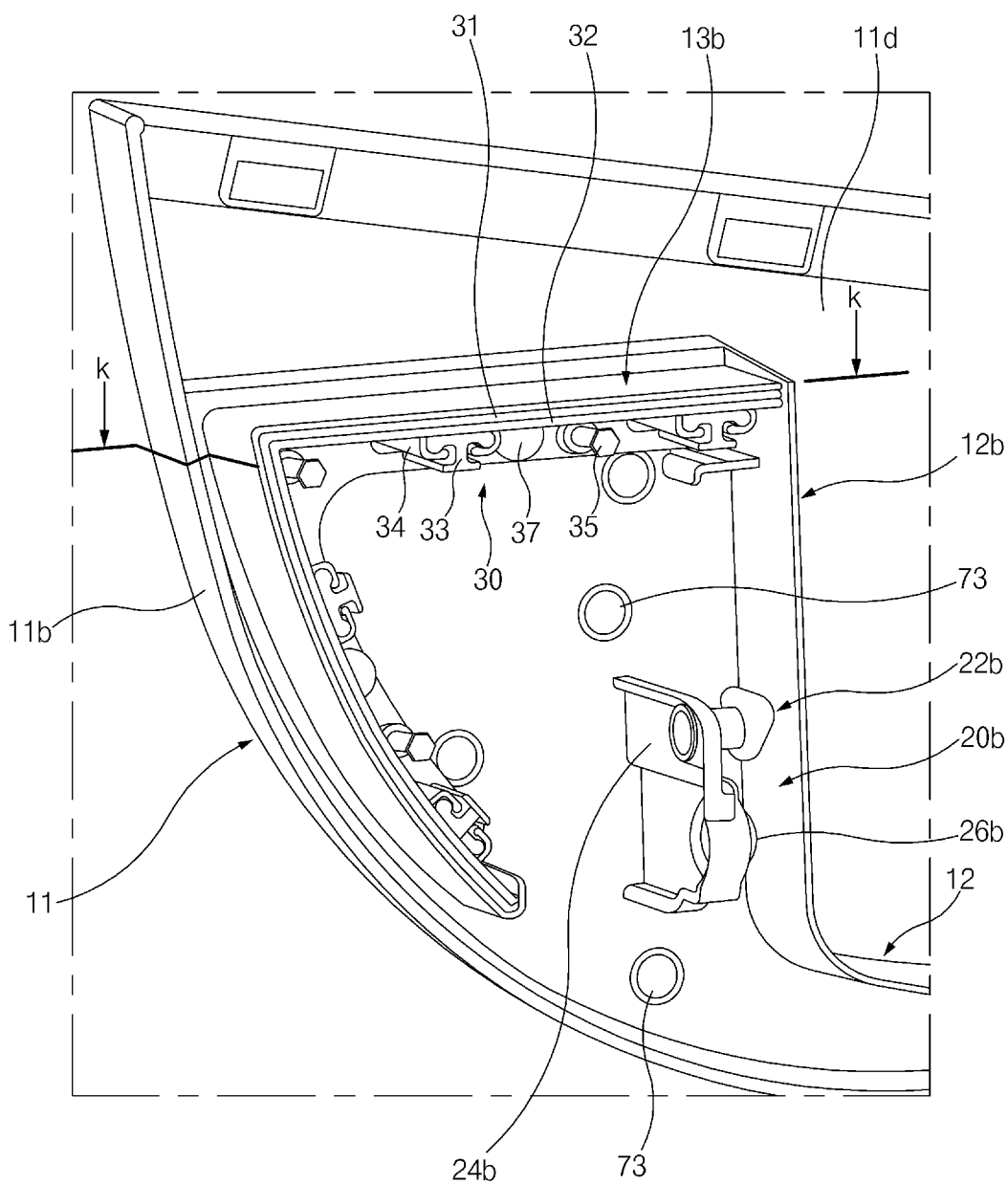
FIG. 17 illustrates a map pocket assembly and a covering mechanism of a vehicle door according to various exemplary embodiments of the present invention.

Referring to FIG. 17, the first cover member 31 may be slidably mounted to the rear covering wall 13b of the second pocket member 12, and the second cover member 32 may be slidably mounted to the first cover member 31. The first cover member 31 and the second cover member 32 may cover the space between the map pocket assembly 10 and the door module panel 2a of the door module 2 of the vehicle door 1.

Figure 18:
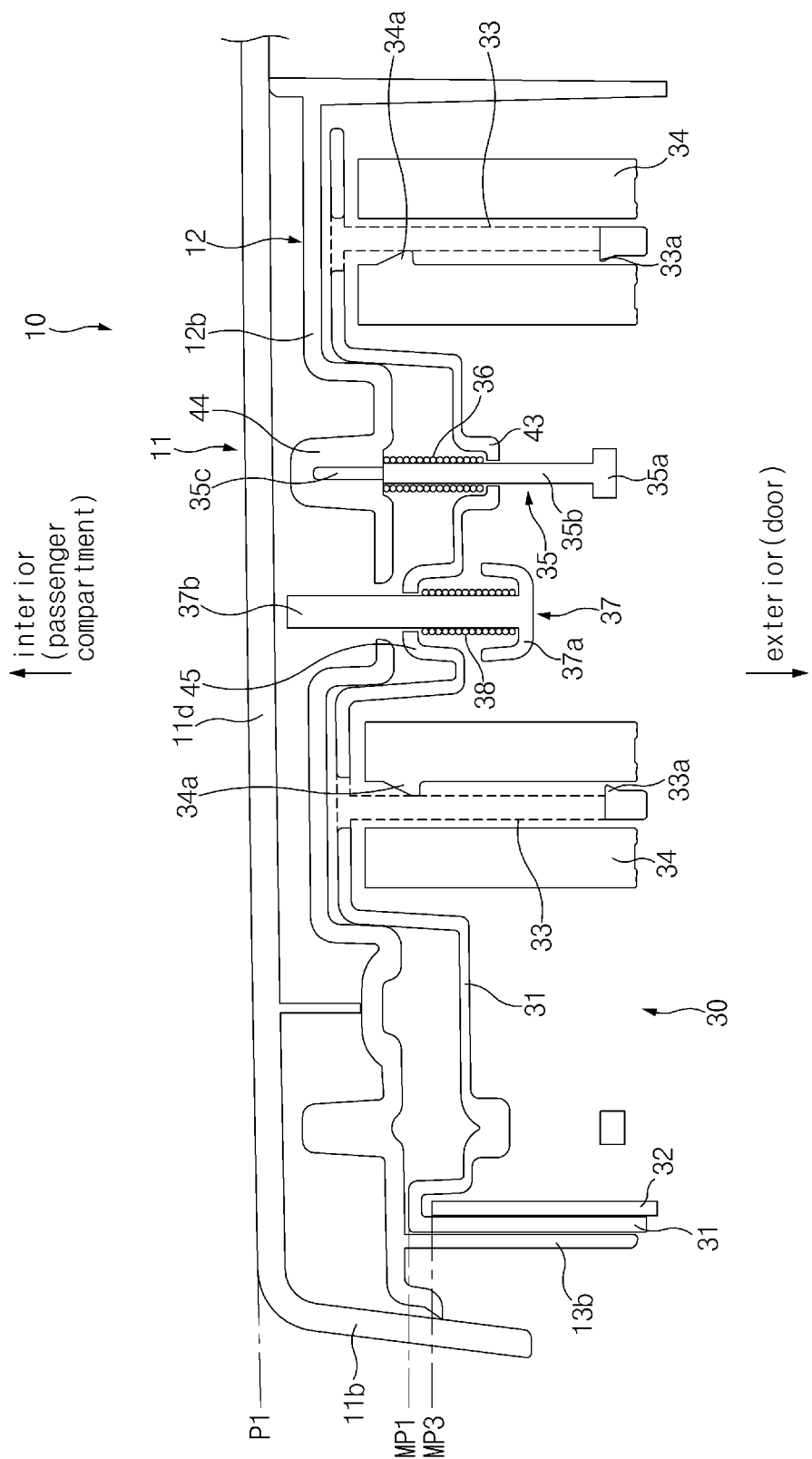
FIG. 18 illustrates a cross-sectional view, taken along line K-K of FIG. 17, in a state in which the map pocket assembly is in a retracted position.
Figure 19:
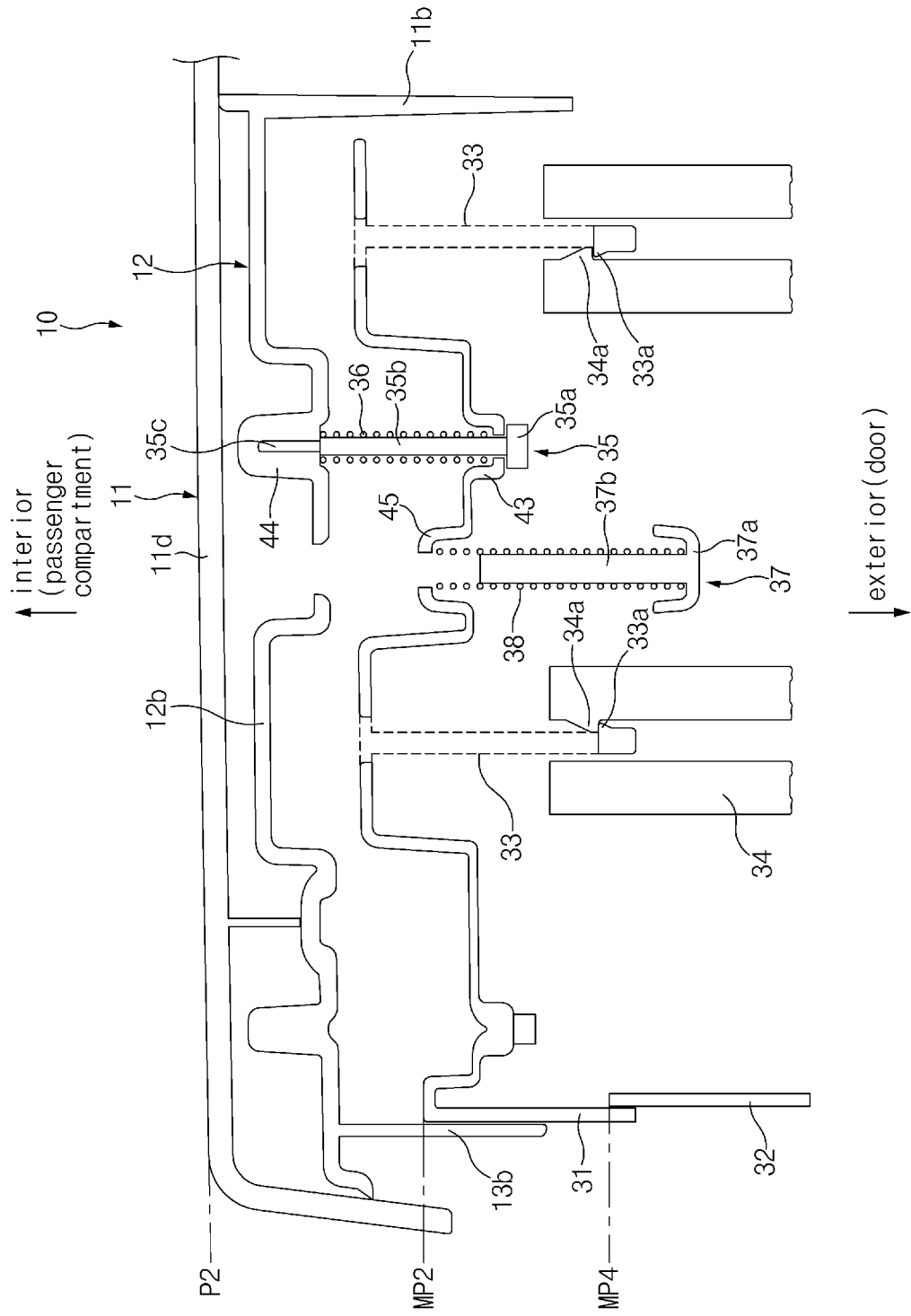
FIG. 19 illustrates a cross-sectional view, taken along line K-K of FIG. 17, in a state in which the map pocket assembly is in an extended position.

Referring to FIGS. 18 and 19, the first cover member 31 may be movably connected to the second pocket member 12 through a first guide pin 35 and a first spring 36. The first cover member 31 may include a first mounting boss 43, and the first mounting boss 43 may have a through hole through which the first guide pin 35 extends. The second pocket member 12 may include a second mounting boss 44 facing the first mounting boss 43, and the second mounting boss 44 may have a recess to which the first guide pin 35 is fixed. The first guide pin 35 may include a head 35a, a rod 35b extending from the head 35a, and a fixed end portion 35c extending from an end portion of the rod 35b. The head 35a may have an external diameter greater than an internal diameter of the through hole of the first mounting boss 43, and the rod 35b may have an external diameter less than the internal diameter of the through hole of the first mounting boss 43. The fixed end portion 35c may be fixed to the recess of the second mounting boss 44. For example, the fixed end portion 35c may have an external diameter greater than an internal diameter of the recess of the second mounting boss 44, and the fixed end portion 35c may be press-fitted into the recess of the second mounting boss 44. As various exemplary embodiments of the present invention, the fixed end portion 35c may have a screw portion formed on an external circumference thereof, and the screw portion of the fixed end portion 35c may be screwed into the recess of the second mounting boss 44. The first spring 36 may be located between the first mounting boss 43 and the second mounting boss 44, and the first spring 36 may be disposed around the first guide pin 35. The first cover member 31 may be elastically movable with respect to the second pocket member 12 by the first spring 36.

Referring to FIGS. 14, 18, and 19, as the map pocket assembly 10 moves, the first cover member 31 may move between a first maximum overlap position MP1 and a first minimum overlap position MP2. The first maximum overlap position MP1 may be a position in which the first cover member 31 is relatively close to the second pocket member 12 and maximally overlaps the covering wall 13b of the second pocket member 12, and the first minimum overlap position MP2 may be a position in which the first cover member 31 is relatively far from the second pocket member 12 and minimally overlaps the covering wall 13b of the second pocket member 12. When the map pocket assembly 10 moves toward the retracted position P1, the second pocket member 12 may be relative closer to the first cover member 31, and the first cover member 31 may move toward the first maximum overlap position MP1 in which the first spring 36 may be compressed between the first mounting boss 43 and the second mounting boss 44. The compression of the first spring 36 may be constantly maintained by the rack and pinion mechanism and/or a magnet 51 and a magnetic metal 52 to be described below. When the map pocket assembly 10 moves toward the extended position P2, the second pocket member 12 may be relatively far from the first cover member 31, and as the first spring 36 is extended, the first cover member 31 may move toward the first minimum overlap position MP2. That is, when the map pocket assembly 10 moves toward the interior (the passenger compartment) of the vehicle, the first cover member 31 may move toward the exterior of the vehicle by the first spring 36 so that the first cover member 31 may move toward the first minimum overlap position MP2 in which the first cover member 31 minimally overlaps the covering wall 13b of the second pocket member 12. Accordingly, the first cover member 31 may at least partially cover a space between the door module panel 2a and the covering wall 13b of the second pocket member 12.

Referring to FIGS. 18 and 19, the second cover member 32 may be slidably mounted to the first cover member 31. The second cover member 32 may be movably connected to the first cover member 31 through a second guide pin 37 and a second spring 38. The second cover member 32 may have a third mounting boss 45, and the third mounting boss 45 may have a through hole through which the second guide pin 37 extends. The second pocket member 12 may have a through hole aligned with the third mounting boss 45. The second guide pin 37 may include a head 37a, and a rod 37b extending from the head 37a. The head 37a may have an external diameter greater than an internal diameter of the through hole of the third mounting boss 45, and the head 37a may face the third mounting boss 45. The rod 37b may have an external diameter less than the internal diameter of the through hole of the third mounting boss 45 and an internal diameter of the through hole of the second pocket member 12, and the rod 37b may extend through the through hole of the third mounting boss 45 and the through hole of the second pocket member 12. The second spring 38 may be located between the head 37a of the second guide pin 37 and the third mounting boss 45, and the second spring 38 may be disposed around the second guide pin 37. The second cover member 32 may be elastically movable with respect to the first cover member 31 by the second guide pin 37 and the second spring 38.

Referring to FIGS. 14, 18, and 19, as the second pocket member 12 moves, the second cover member 32 may move between a second maximum overlap position MP3 and a second minimum overlap position MP4. The second maximum overlap position MP3 may be a position in which the second cover member 32 is relatively close to the first cover member 31 and maximally overlaps the first cover member 31, and the second minimum overlap position MP4 may be a position in which the second cover member 32 is relatively far from the first cover member 31 and minimally overlaps the first cover member 31. When the map pocket assembly 10 moves to the retracted position P1, the second cover member 32 may be relatively closer to the first cover member 31, and the second cover member 32 may move toward the second maximum overlap position MP3 in which the second spring 38 may be compressed between the third mounting boss 45 and the head 37a of the second guide pin 37. The compression of the second spring 38 may be constantly maintained by the rack and pinion mechanism and/or the magnet 51 and the magnetic metal 52 to be described below.

When the map pocket assembly 10 moves toward the extended position P2, the first cover member 31 may be relatively far from the second cover member 32, and as the second spring 38 is extended between the third mounting boss 45 and the head 37a of the second guide pin 37, the second cover member 32 may move toward the second minimum overlap position MP4. That is, when the map pocket assembly 10 moves toward the interior (the passenger compartment) of the vehicle, the second cover member 32 may move toward the exterior of the vehicle by the second spring 38 so that the second cover member 32 may move toward the second minimum overlap position MP4 in which the second cover member 32 minimally overlaps the first cover member 31. Accordingly, the second cover member 32 may at least partially cover the space between the door module panel 2a and the covering wall 13b of the second pocket member 12.

The compression of the first spring 36 and the compression of the second spring 38 may be constantly maintained by the rack and pinion mechanism.

Referring to FIGS. 14 and 19, when the map pocket assembly 10 moves toward the extended position P2, the first cover member 31 may move toward the first minimum overlap position MP2 in which the first cover member 31 minimally overlaps the covering wall 13b of the second pocket member 12, and the second cover member 32 may move toward the second minimum overlap position MP4 in which the second cover member 32 minimally overlaps the first cover member 31 so that the covering wall 13b of the second pocket member 12, the first cover member 31 and the second cover member 32 may completely cover the space between the map pocket assembly 10 and the door module panel 2a. That is, when the map pocket assembly 10 moves toward the extended position P2, the first cover member 31 and the second cover member 32 may move toward the door module 2 of the vehicle door 1, completely covering the space between the map pocket assembly 10 and the door module panel 2a.

Referring to FIGS. 17 to 19, the first cover member 31 may have a plurality of guide bars 33, and each guide bar 33 may extend along a movement direction of the map pocket assembly 10. Each guide bar 33 may have a first stopper 33a, and the first stopper 33a may protrude from the guide bar 33. The second cover member 32 may have a plurality of guide rails 34, and each guide rail 34 may extend along the movement direction of the map pocket assembly 10. The guide rails 34 may receive the guide bars 33, respectively. Each guide rail 34 may have a second stopper 34a, and the second stopper 34a may protrude inwardly from the guide rail 34. The guide bar 33 of the first cover member 31 may be received in the guide rail 34 of the second cover member 32, and the first cover member 31 and the second cover member 32 may slide with respect to each other through the guide bar 33 and the guide rail 34.

When the locking recess 41a of the guide members 22a and 22b is caught by the locking projection 23d of the locking lug 23 as the map pocket assembly 10 moves toward the extended position P2, the first cover member 31 may be in the first minimum overlap position MP2, and the second cover member 32 may be in the second minimum overlap position MP4. The first stopper 33a of the guide bar 33 may come into contact with the second stopper 34a of the guide rail 34 so that the guide bar 33 and the guide rail 34 may be stopped, and thus the first cover member 31 may be kept in the first minimum overlap position MP2, and the second cover member 32 may be kept in the second minimum overlap position MP4.

FIGS. 13, 14, and 17 to 19 illustrate the covering mechanism 30 mounted on the rear portion 12b of the second pocket member 12 of the map pocket assembly 10 to cover the rear guide mechanism 20a. According to the exemplary embodiment illustrated in FIGS. 13, 14, and 17 to 19, since the front portion of the vehicle door 1 is adjacent to a door hinge of the vehicle door 1, the front portion of the map pocket assembly 10 may be less exposed than the rear portion of the map pocket assembly 10, and thus the covering mechanism 30 may not be mounted on the front portion of the map pocket assembly 10 (that is, the front portion 12*a* of the second pocket member 12).

According to another exemplary embodiment of the present invention, the covering mechanism 30 may be mounted on each of the front and rear portions of the map pocket assembly 10. That is, two covering mechanisms may be mounted on the front portion 12*a* and the rear portion 12*b* of the second pocket member 12, respectively.

Figure 16:
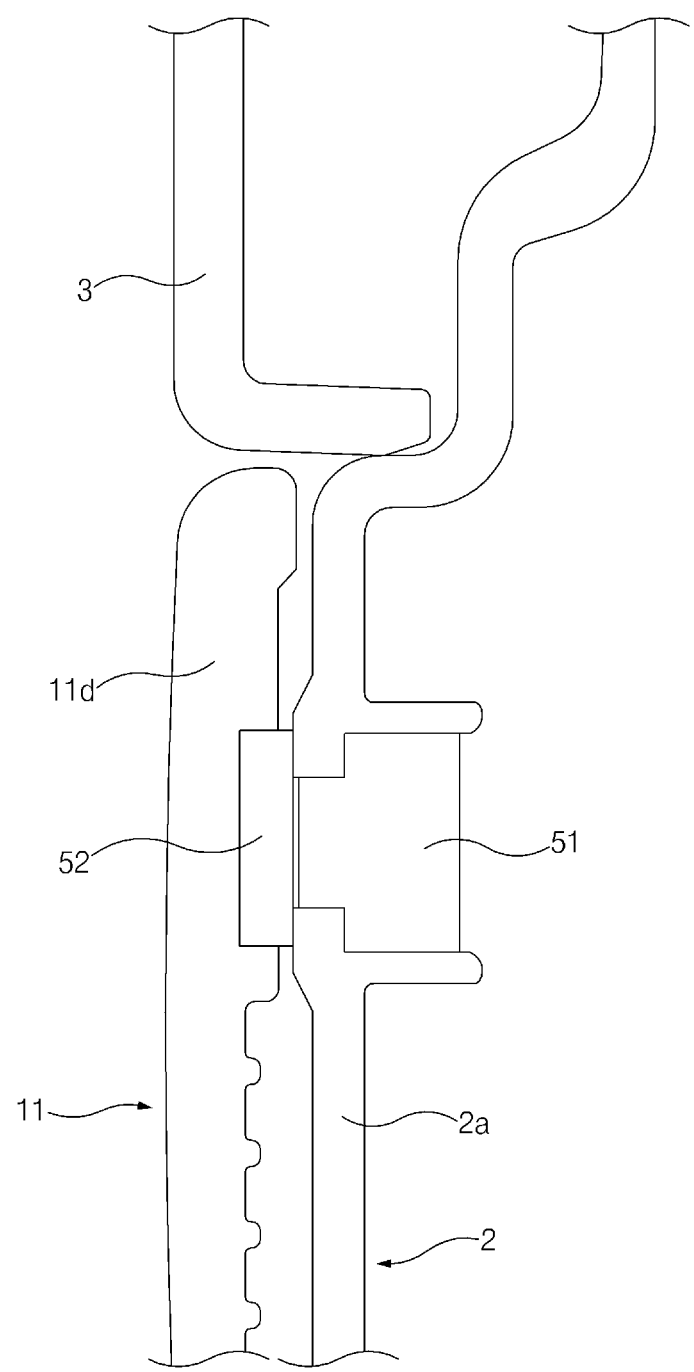
FIG. 16 illustrates a cross-sectional view, taken along line J-J of FIG. 1.

Referring to FIG. 16, the storage system for a vehicle door according to various exemplary embodiments of the present invention may include at least one magnet 51 mounted on the door module panel 2*a* of the door module 2, and at least one magnetic metal 52 mounted on the map pocket assembly 10. According to various exemplary embodiments of the present invention, the plurality of magnetic metals 52 may be mounted on a front top end portion and/or rear top end portion of the side wall 11*d* of the first pocket member 11, and the plurality of magnets 51 may be mounted on the door module panel 2*a*. The magnets 51 may be aligned with the magnetic metals 52, respectively, and the magnetic metals 52 may be attached to the magnets 51 by a magnetic force. When the map pocket assembly 10 is joined to the door module panel 2*a*, the front top edge portion and rear top edge portion of the first pocket member 11 may be held on the door module panel 2*a* by the magnets 51 and the magnetic metals 52. Thus, the map pocket assembly 10 may be accurately positioned with respect to the door module 2 of the vehicle door, and the assembly thereof may be made with ease and precision. The map pocket assembly 10 may be kept in the retracted position P1 by the magnets 51 and the magnetic metals 52.

As set forth above, according to exemplary embodiments of the present invention, as the map pocket assembly moves relative to the vehicle door, the volume of the storage compartment defined between the map pocket assembly and the vehicle door may be varied. Various map pocket assemblies may be selectively provided according to the users' tastes, and user convenience may be improved. Furthermore, the old map pocket assembly with contamination and scratches may be easily replaced with a new map pocket assembly.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A storage system for a vehicle door, the storage system comprising:
   a vehicle door;
   a map pocket assembly movable with respect to the vehicle door; and
   a guide mechanism guiding a movement of the map pocket assembly,
   wherein the guide mechanism includes a guide rail provided on the vehicle door, and a guide member provided on the map pocket assembly and slidable along the guide rail,
   wherein a storage compartment is defined between the map pocket assembly and the vehicle door,
   wherein the guide rail includes a locking lug,
   wherein the locking lug is defined by a 'U'-shaped slot, and
   wherein the locking lug is cantilevered from the guide rail.

2. The storage system of claim 1,
   wherein the map pocket assembly is movable with respect to a door module of the vehicle door,
   wherein the map pocket assembly is movable between a retracted position and an extended position,
   wherein the retracted position is a position in which the map pocket assembly is relatively close to the vehicle door, and
   wherein the extended position is a position in which the map pocket assembly is relatively far from the vehicle door.

3. The storage system of claim 2,
   wherein the guide rail protrudes from the vehicle door toward the map pocket assembly,
   wherein the map pocket assembly includes a mounting projection protruding toward the vehicle door,
   wherein the guide member is mounted on the mounting projection, and
   wherein a longitudinal axis of the mounting projection is parallel to a longitudinal axis of the guide rail.

4. The storage system of claim 3,
   wherein the guide member includes a guide head and a shank extending from the guide head,
   wherein the shank is mounted on the mounting projection by a fastener, and
   wherein the guide head is movably received in the guide rail.

5. The storage system of claim 4,
   wherein the guide head has a locking recess,
   wherein the locking lug has a locking projection, and
   wherein when the map pocket assembly is in the extended position, the locking recess of the guide head is caught by the locking projection of the locking lug so that the guide member is locked to the locking lug.

6. The storage system of claim 1, wherein the map pocket assembly includes:
   a first pocket member having a shape of a pocket; and
   a second pocket member mounted on predetermined edge portions of the first pocket member.

7. The storage system of claim 6, further including:
   a covering mechanism covering a space between the map pocket assembly and the vehicle door when the map pocket assembly moves,
   wherein the covering mechanism includes a first cover member movably connected to the second pocket member, and a second cover member movably connected to the first cover member.

8. The storage system of claim 7,
wherein the first cover member is movably connected to the second pocket member through a first guide pin and a first spring,
wherein the first cover member includes a first mounting boss having a through hole through which the first guide pin extends,
wherein the second pocket member includes a second mounting boss having a recess to which the first guide pin is fixed, and
wherein the first spring is located between the first mounting boss and the second mounting boss.

9. The storage system of claim 8,
wherein the first guide pin includes a head, a rod extending from the head, and a fixed end portion extending from an end portion of the rod,
wherein the head has an external diameter greater than an internal diameter of the through hole of the first mounting boss, and
wherein the fixed end portion is fixed to the recess of the second mounting boss.

10. The storage system of claim 7,
wherein the first cover member moves between a first maximum overlap position and a first minimum overlap position as the map pocket assembly moves,
wherein the first maximum overlap position is a position in which the first cover member maximally overlaps a covering wall of the second pocket member, and
wherein the first minimum overlap position is a position in which the first cover member minimally overlaps the covering wall of the second pocket member.

11. The storage system of claim 7,
wherein the second cover member is movably connected to the first cover member through a second guide pin and a second spring,
wherein the second cover member includes a third mounting boss having a through hole through which the second guide pin extends,
wherein the second pocket member has a through hole aligned with the through hole of the third mounting boss,
wherein the second guide pin includes a head and a rod extending from the head,
wherein the head has an external diameter greater than an internal diameter of the through hole of the third mounting boss,
wherein the head faces the third mounting boss, and
wherein the second spring is located between the head of the second guide pin and the third mounting boss.

12. The storage system of claim 7,
wherein the second cover member moves between a second maximum overlap position and a second minimum overlap position as the map pocket assembly moves,
wherein the second maximum overlap position is a position in which the second cover member maximally overlaps the first cover member, and
wherein the second minimum overlap position is a position in which the second cover member minimally overlaps the first cover member.

13. The storage system of claim 7, wherein the second pocket member includes a covering wall with which the guide mechanism is covered.

14. The storage system of claim 13,
wherein the first cover member is slidably mounted to the covering wall of the second pocket member, and
wherein the second cover member is slidably mounted to the first cover member.

15. The storage system of claim 14,
wherein the first cover member has a guide bar extending along a movement direction of the map pocket assembly, and
wherein the second cover member has a guide rail in which the guide bar is received.

16. The storage system of claim 15,
wherein the guide bar has a first stopper,
wherein the guide rail has a second stopper, and
wherein when the map pocket assembly is in the extended position, the first stopper of the guide bar comes into contact with the second stopper of the guide rail.

17. The storage system of claim 1, further including a rack and pinion mechanism assisting a movement of the map pocket assembly,
wherein the rack and pinion mechanism includes a rack provided on the vehicle door, and a pinion rotatably mounted on the map pocket assembly, and
wherein the pinion is gear-engaged to the rack.

18. The storage system of claim 1, further including:
a magnet mounted on the vehicle door; and
a magnetic metal mounted on the map pocket assembly,
wherein when the map pocket assembly is joined to the vehicle door, the map pocket assembly is held on the vehicle door by the magnet and the magnetic metal.

* * * * *